US012694118B2

(12) United States Patent
Hamlin et al.

(10) Patent No.: US 12,694,118 B2
(45) Date of Patent: Jul. 28, 2026

(54) OPERATING SYSTEM DISCOVERY OF, AND INTERACTION WITH, FIRMWARE FRAMEWORK DEVICES

(71) Applicant: Dell Products L.P., Round Rock, TX (US)

(72) Inventors: Daniel L. Hamlin, Round Rock, TX (US); Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 162 days.

(21) Appl. No.: 18/619,546

(22) Filed: Mar. 28, 2024

(65) Prior Publication Data

US 2025/0307406 A1      Oct. 2, 2025

(51) Int. Cl.
G06F 21/57            (2013.01)

(52) U.S. Cl.
CPC .................................. G06F 21/572 (2013.01)

(58) Field of Classification Search
CPC ..... G06F 9/00; G06F 9/24; G06F 9/48; G06F 9/50
See application file for complete search history.

(56) References Cited

U.S. PATENT DOCUMENTS

| | | | | | |
|---|---|---|---|---|---|
| 7,149,888 B1 * | 12/2006 | Hart | ...................... | G06F 9/4406 |
| | | | | | 713/2 |
| 9,471,811 B2 * | 10/2016 | Kobres | ................... | H04L 41/28 |
| 10,062,123 B2 * | 8/2018 | Mo | ........................ | G06Q 10/40 |
| 11,960,392 B1 * | 4/2024 | Nakibly | .............. | G06F 12/0292 |
| 2011/0191571 A1 * | 8/2011 | Perusse, Jr. | ............... | G06F 9/00 |
| | | | | | 713/1 |
| 2016/0019089 A1 * | 1/2016 | Jeong | .................... | G06F 9/5027 |
| | | | | | 718/102 |
| 2018/0063226 A1 * | 3/2018 | Chiu | ........................ | H04L 67/06 |
| 2020/0320201 A1 * | 10/2020 | Robinson | ................ | G06F 21/64 |
| 2024/0118921 A1 * | 4/2024 | Read | ..................... | G06F 9/5083 |

* cited by examiner

*Primary Examiner* — Hyun Soo Kim

(74) *Attorney, Agent, or Firm* — Fogarty LLP

(57)            ABSTRACT

Systems and methods for Operating System (OS) discovery of, and interaction with, firmware framework devices. In some embodiments, an Information Handling System (IHS) may include one or more processors; a memory coupled to the one or more processors, where the memory includes program instructions that, upon execution by the one or more processors, cause the one or more processors to instantiate an OS; a controller, where the controller includes firmware that, upon execution by a processing core, causes the processing core to instantiate an orchestrator; and a plurality of devices coupled to the controller, where each device includes firmware that, upon execution by a corresponding processing core, causes the corresponding processing core to instantiate a node, where the nodes are configured to communicate with the orchestrator within a firmware framework without any involvement by the OS, and where the nodes and orchestrator are further configured to communicate with the OS.

19 Claims, 10 Drawing Sheets

START 801

INITIATE SERVICES
AND AGENTS
802

LOAD POLICIES 803

OPERATE SERVICES AND AGENTS BASED ON
POLICIES AND CONTEXT
804

END 805

800

900

1000

OPERATING SYSTEM DISCOVERY OF, AND INTERACTION WITH, FIRMWARE FRAMEWORK DEVICES

FIELD

This disclosure relates generally to Information Handling Systems (IHSs), and more specifically, to operating system (OS) discovery of, and interaction with, firmware framework devices.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, IHSs with desktop and laptop form factors have had conventional host Operating Systems (OSs) (e.g., WINDOWS, LINUX, MAC OS, etc.) executed on INTEL or AMD's "x86"-type processors. Other types of processors, such as ARM processors, have been used in smartphones and tablet devices, which typically run thinner, simpler, or mobile OSs (e.g., ANDROID, IOS, WINDOWS MOBILE, etc.).

As of more recently, however, IHS manufacturers have begun shipping full-fledged desktop and laptop IHSs equipped with ARM-based platforms, and some OSs (e.g., WINDOWS on ARM) have been developed to provide users with more quintessential OS experiences on those platforms.

Therefore, a modern IHS may now include any number of processors, controllers, sensors, and/or other devices. Within an IHS, each device may be configured to execute their own firmware. The term "firmware," as used herein, refers to a class of program instructions that provides low-level control of a device's hardware.

In that regard, the inventors hereof have recognized that management of a device's firmware within an IHS is typically performed indirectly through the IHS's OS, which presents efficiency, productivity, and/or security issues. To address these, and other concerns, the inventors hereof have developed a firmware framework as described herein.

SUMMARY

Systems and methods for OS discovery of, and interaction with, firmware framework devices are described. In an illustrative, non-limiting embodiment, an Information Handling System (IHS) may include one or more processors; a memory coupled to the one or more processors, where the memory includes program instructions stored thereon that, upon execution by the processor, cause the one or more processors to instantiate an Operating System (OS); a controller, where the controller includes firmware that, upon execution by a processing core, causes the processing core to instantiate an orchestrator; and a plurality of devices coupled to the controller, where each device includes firmware that, upon execution by a corresponding processing core, causes the corresponding processing core to instantiate a node, where the nodes are configured to communicate with the orchestrator within a firmware framework without any involvement by the OS, and where the nodes and orchestrator are further configured to communicate with the OS.

In some embodiments, the controller includes an Embedded Controller (EC) or Baseband Management Controller (BMC). In some embodiments, the plurality of devices includes at least one of: a sensor, a sensor hub, a Central Processing Unit (CPU), a Graphical Processing Unit (GPU), an audio Digital Signal Processor (aDSP), a Neural Processing Unit (NPU), a Tensor Processing Unit (TSU), a Neural Network Processor (NNP), an Intelligence Processing Unit (IPU), an Image Signal Processor (ISP), or a Video Processing Unit (VPU), a camera controller, an audio controller, a memory, a Universal Serial Bus (USB) device, a Peripheral Component Interconnect express (PCIe) device, or a Trusted Platform Module (TPM). In some embodiments, at least one of the plurality of devices is coupled to the controller via at least one of: a Systems-on-Chip (SoC) interconnect, a Peripheral Component Interconnect Express (PCIe) bus, or a Universal Serial Bus (USB) port. In some embodiments, the SoC interconnect includes at least one of: an Advanced Microcontroller Bus Architecture (AMBA) bus, a QuickPath Interconnect (QPI) bus, or a HyperTransport (HT) bus. In some embodiments, at least one of the plurality of devices or the controller is coupled to the one or more processors via at least one of: a Systems-on-Chip (SoC) interconnect, a Peripheral Component Interconnect Express (PCIe) bus, or a Universal Serial Bus (USB) port. In some embodiments, the orchestrator or at least one of the plurality of nodes is configured to communicate with the OS via two or more distinct communication protocols.

In some embodiments, the orchestrator or a given node is configured to provide, in the firmware framework, one or more orchestration services selected from the group consisting of: an OS discovery service, and an OS communication service. In some of these embodiments, the OS discovery service is configured at least in part by a policy to receive, from the orchestrator or the given node, an identification of at least one of: a given device corresponding to the given node, the controller corresponding to the orchestrator, a distance or latency of the given node from the orchestrator, a capability of the orchestrator or the given node, or a firmware version of the orchestrator or the given node. In some embodiments, the OS discovery service is configured at least in part by a policy to receive, from the orchestrator or the given node, an identification of at least one of: (i) one or more capabilities of the orchestrator or the given node; and (ii) one or more interfaces usable to access the one or more capabilities. In some of these embodiments, the OS discovery service is configured at least in part by a policy to: produce a manifest based, at least in part, upon the one or more capabilities and the one or more interfaces; and communicate the manifest to the OS.

In some embodiments, the OS discovery service is configured at least in part by a policy to: ascertain a topology of the plurality of nodes, or of the orchestrator and the plurality of nodes; and communicate the topology to the OS. In some embodiments, the topology includes at least one parent node coupled to at least one child node In some embodiments, the OS communication service is configured at least in part by a policy to: receive a command from the OS; and provide for the execution of the command from the OS. In some of these embodiments, to provide for the execution of the command from the OS, the OS communication service is further configured to distribute the command to a different node.

In another illustrative, non-limiting embodiment, a method includes: producing, via a controller within an Information Handling System (IHS), an orchestrator of a firmware framework; producing, via a plurality of devices coupled to the controller, a plurality of nodes, where each node is configured to communicate with the orchestrator; enabling a first node, at least in part via an orchestration service provided by the orchestrator, to invoke a capability of a second node without any involvement by an Operating System (OS) of the IHS; enabling the OS, at least in part via an OS orchestration service provided by the orchestrator, to invoke a capability of a node of the plurality of nodes.

In some embodiments, the method further includes: coupling a child device to a parent device; in response to the coupling, producing, via the child device, a child node with respect to a parent node produced by the parent device in the firmware framework; and enabling, at least in part by the orchestrator, the OS to invoke a capability of the child node. In some embodiments, the method further includes: decoupling the child device from the parent device; and in response to the decoupling, removing the child node from the firmware framework.

In another illustrative, non-limiting embodiment, an Embedded Controller (EC) is integrated into or coupled to a heterogeneous computing platform of an Information Handling System (IHS), the EC including: a processing core distinct from a host processor of the heterogeneous computing platform, where the host processor executes an operating system (OS); and a memory coupled to the processing core, the memory having firmware instructions stored thereon that, upon execution by the processing core, cause the EC to: produce an orchestrator as part of a firmware framework; discover a node coupled to the orchestrator, where the node is configured to participate in the firmware framework; and communicate information regarding the orchestrator and the node to the OS.

In some embodiments, the node is produced by a device integrated or coupled to the heterogeneous firmware platform.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
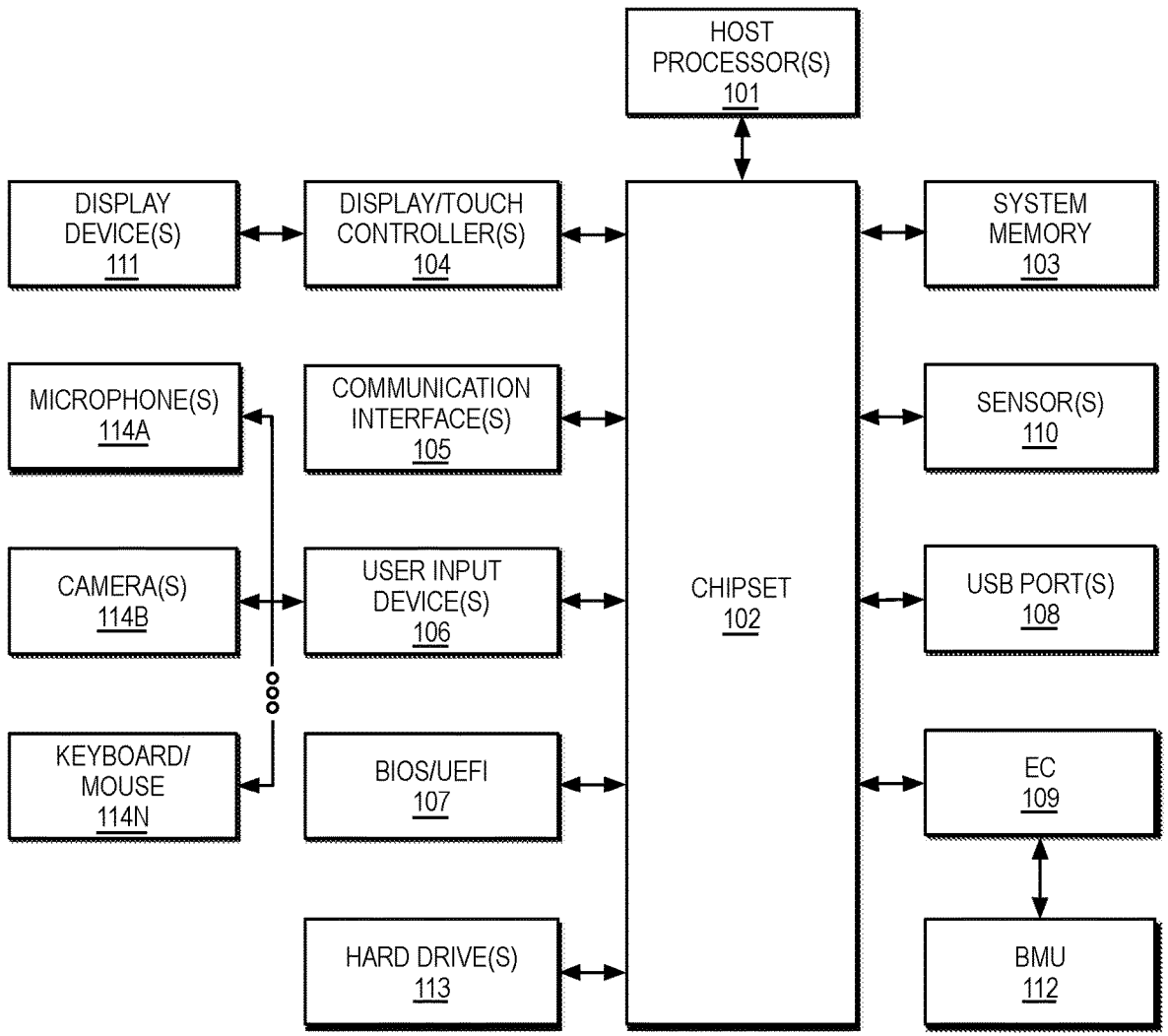
FIG. 1 is a diagram illustrating examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc.

The term "firmware," as used herein, refers to a class of program instructions that provides low-level control for a device's hardware. Firmware enables basic functions of a device and/or provides hardware abstraction services to higher-level software, such as an Operating System (OS). The term "firmware installation package," as used herein, refers to program instructions that, upon execution, deploy device drivers or services in an IHS or IHS component.

The term "device driver" or "driver," as used herein, refers to program instructions that operate or control a particular type of device. A driver provides a software interface to hardware devices, enabling an OS and other applications to access hardware functions without needing to know precise details about the hardware being used. When an application invokes a routine in a driver, the driver issues commands to a corresponding device. Once the device sends data back to the driver, the driver may invoke certain routines in the application. Generally, device drivers are hardware dependent and OS-specific.

The term "telemetry," as used herein, refers to information resulting from in situ collection of measurements or other data by devices within a heterogenous computing platform, or any other IHS device or component, and its transmission (e.g., automatically) to a receiving entity, for example, for monitoring purposes. Typically, telemetry may include, but is not limited to, measurements, metrics, and/or values which may be indicative of: core utilization, memory utilization, CPU performance state, network quality/utilization/bandwidth/throughput, battery charging or state data, peripheral or I/O device utilization, temperature, location, acceleration, power state, etc.

For instance, telemetry data may include, but is not limited to, measurements, metrics, logs, or other information related to: current or average utilization of IHS components or devices, CPU/core loads, instant or average power consumption, instant or average memory usage, characteristics of a network or radio system (e.g., WiFi vs. 5G, bandwidth, latency, etc.), transaction times, latencies, response codes, errors, data produced by other sensors, etc.

FIG. 1 is a block diagram of components of IHS 100. As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as Ethernet, WiFi, BT, cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more Universal Serial Bus (USB) ports/controllers 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each user input device 106 may include a respective controller (e.g., a touchpad may have its own touchpad controller) that interfaces with chipset 102 through a wired or wireless connection (e.g., via communication interfaces(s) 105).

In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensors 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

BIOS/UEFI 107 is coupled to chipset 102. UEFI was designed as a successor to BIOS, and many modern IHSs utilize UEFI in addition to or instead of a BIOS. Accordingly, BIOS/UEFI 107 is intended to also encompass a UEFI component BIOS/UEFI 107 provides an abstraction layer that allows the OS to interface with certain hardware components that are utilized by IHS 100.

Upon booting of IHS 100, host processor(s) 101 may utilize program instructions of BIOS 107 to initialize and test hardware components coupled to IHS 100, and to load a host OS for use by IHS 100. Via the hardware abstraction layer provided by BIOS/UEFI 107, software stored in system memory 103 and executed by host processor(s) 101 can interface with I/O devices coupled to IHS 100.

Embedded Controller (EC) 109 (sometimes referred to as a Baseboard Management Controller or "BMC") includes a microcontroller unit or processing core dedicated to handling selected IHS operations not ordinarily handled by host processor(s) 101.

Examples of such operations may include, but are not limited to: power sequencing, power management, receiving and processing signals from a keyboard or touchpad, as well as other buttons and switches (e.g., power button, laptop lid switch, etc.), receiving and processing thermal measurements (e.g., performing cooling fan control, throttling CPUs and GPUs, controlling colling fan speeds, and emergency shutdown), controlling indicator Light-Emitting Diodes or "LEDs" (e.g., caps lock, scroll lock, num lock, battery, ac, power, wireless LAN, sleep, etc.), managing the battery charger and the battery, enabling remote or Out-of-Band (OOB) management, diagnostics, and remediation over network(s) 103, etc.

Unlike other devices in IHS 100, EC 109 may be made operational from the very start of each power reset, before other devices are fully running or powered on. As such, EC 109 may be responsible for interfacing with a power adapter to manage the power consumption of IHS 100. These operations may be utilized to determine the power status of IHS 100, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

In some cases, EC 109 may implement operations for detecting certain changes to the physical configuration or posture of IHS 100 and managing other devices in different configurations of IHS 100. For instance, when IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some implementations, EC 109 may be installed as a Trusted Execution Environment (TEE) component to the motherboard of IHS 100. Additionally, or alternatively, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. As such, EC 109 may validate the integrity of hardware and software components installed in IHS 100.

In addition, EC 109 may provide an Out-of-Band communication channel that allows an Information Technology Decision Maker (ITDM) or Original Equipment Manufacturer (OEM) to manage IHS 100's various settings and configurations, for example, by issuing OOB commands.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion"

battery pack, or a nickel metal hydride or "NiMH" battery pack including one or more rechargeable batteries).

Figure 2:
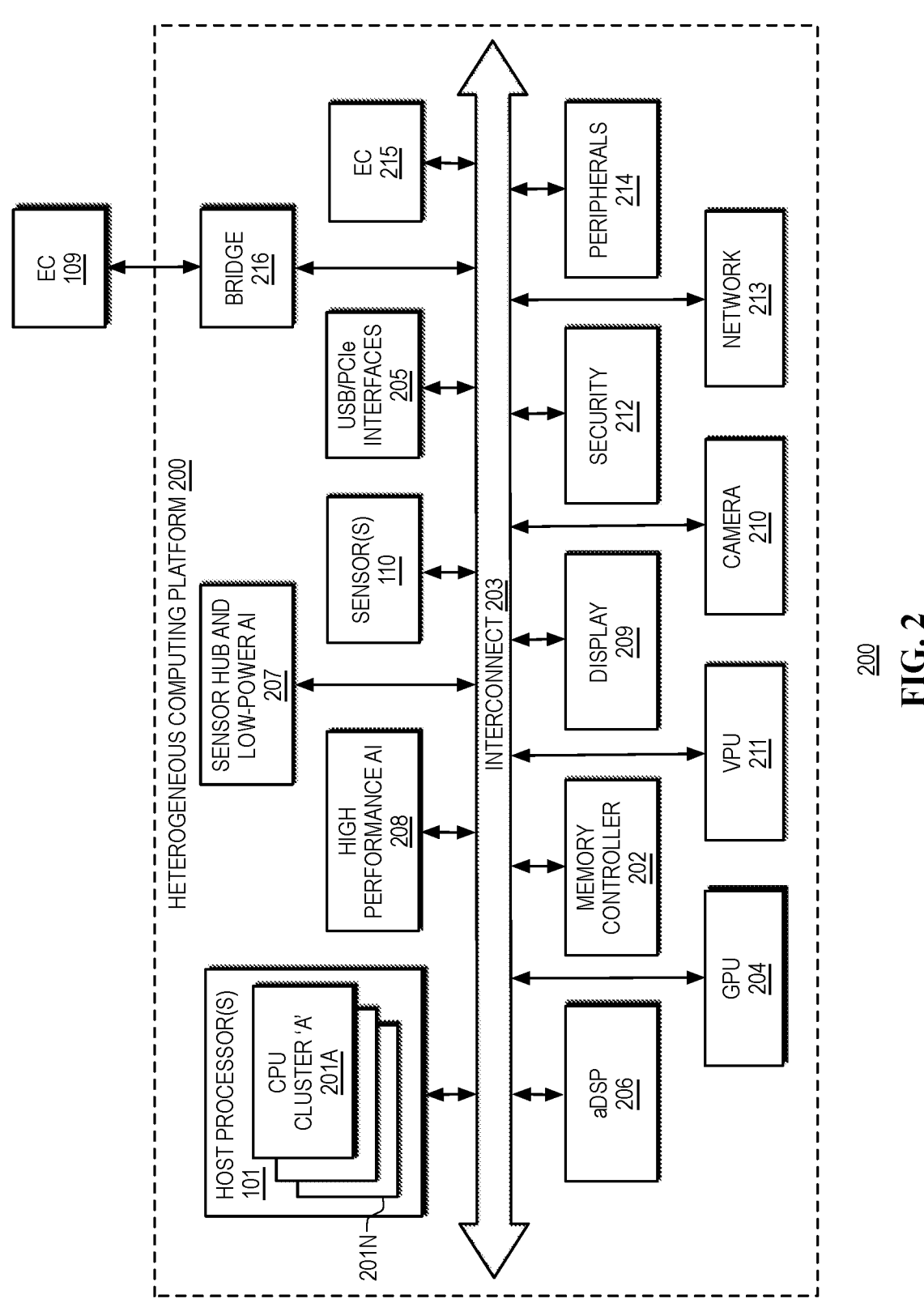
FIG. 2 is a diagram illustrating an example of a heterogenous computing platform, according to some embodiments.

Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to other IHS components, such as, for example devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information or state (e.g., such as ambient temperature, relative humidity, system geolocation measured by GPS or triangulation, time and date, etc.), events, etc.

Examples of events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

FIG. 2 is a diagram illustrating an example of heterogenous computing platform 200. In various embodiments, heterogenous computing platform 200 may be implemented in an SoC, FPGA, ASIC, or the like. Heterogenous computing platform 200 includes a plurality of discrete or segregated devices or components, each device having a different set of processing capabilities suitable for handling a particular type of computational task. When each device in platform 200 executes only the types of computational tasks it is specifically designed to execute, the overall power consumption of heterogenous computing platform 200 is reduced.

In various implementations, each device in heterogenous computing platform 200 may include its own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may execute its own firmware, and it may be accessible through a respective Application Programming Interface (API). Additionally, or alternatively, each device in heterogenous computing platform 200 may execute its own OS. Additionally, or alternatively, one or more of these devices may be a virtual device.

In the example of FIG. 2, heterogenous computing platform 200 includes CPU clusters 201A-N as a particular implementation of host processor(s) 101 intended to perform general-purpose computing operations. Each of CPU clusters 201A-N may include one or more processing core(s) and cache memor(ies). In operation, CPU clusters 201A-N are available and accessible to the IHS's host OS 300 (e.g., WINDOWS on ARM), optimization application(s) 312 (FIG. 3), OS agent(s) 313, and other application(s) 314 executed by IHS 100.

CPU clusters 201A-N are coupled to memory controller 202 via internal interconnect fabric 203. Memory controller 202 is responsible for managing memory accesses for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 can communicate with each other and with a host OS executed by CPU clusters 201A-N.

GPU 204 is a device designed to produce graphical or visual content and to communicate that content to a monitor or display, where the content may be rendered. USB/PCIe interfaces 205 provide an entry point into any additional devices external to heterogenous computing platform 200 that have a respective USB/PCIe interface (e.g., docking station, graphics adapter, Type-C USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc.

In operation, input and/or output audio streams may pass through and be processed by aDSP 206, which can send the processed audio to other devices on internal interconnect fabric 203 (e.g., CPU clusters 201A-N). Also, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.). To that end, aDSP 206 may be coupled to BMU 112.

Sensor hub and low-power AI device 207 is a very low power, always-on device designed to consolidate information received from other devices in heterogenous computing platform 200, process any context and/or telemetry data streams, and provide that information to: (i) a host OS, (ii) other applications, and/or (iii) other devices in platform 200. For example, sensor hub and low-power AI device 207 may include General-Purpose Input/Output (GPIOs) that provide Inter-Integrated Circuit (I²C), Improved I²C (I³C), Serial Peripheral Interface (SPI), Enhanced SPI (eSPI), and/or serial interfaces to receive data from sensors (e.g., sensors 110, camera 210, peripherals 214, etc.).

Sensor hub and low-power AI device 207 may include an always-on, low-power core configured to execute small neural networks and specific applications, such as contextual awareness and other enhancements. In some embodiments, sensor hub and low-power AI device 207 may be configured to operate as an orchestrator device in charge of managing other devices, for example, based upon a policy or the like.

High-performance AI device 208 is a significantly more powerful processing device than sensor hub and low-power AI device 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks.

Display/graphics device 209 is designed to perform additional video enhancement operations. In operation, display/graphics device 209 may provide a video signal to an external display coupled to IHS 100 (e.g., display device(s) 111).

Camera device 210 includes an Image Signal Processor (ISP) configured to receive and process video frames captured by a camera coupled to heterogenous computing platform 200 (e.g., in the visible and/or infrared spectrum).

Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

In some cases, devices 209-211 may be coupled to internal interconnect fabric 203 via a secondary interconnect fabric (not shown). A secondary interconnect fabric may include any bus suitable for inter-device and/or inter-bus communications within a SoC.

Security device 212 includes any suitable security device, such as a dedicated security processor, a Trusted Platform Module (TPM), a TRUSTZONE device, a PLUTON processor, or the like. In various implementations, security device 212 may be used to perform cryptography operations (e.g., generation of cryptographic key pairs, validation of digital certificates, etc.) and/or it may serve as a hardware root-of-trust (RoT) for heterogenous computing platform 200 and/or IHS 100.

Network controller 213 is a device designed to enable wired (e.g., Ethernet) and/or wireless communications in any suitable frequency band (e.g., BLUETOOTH or "BT," WiFi, CDMA, 5G, satellite, etc.), subject to AI-powered optimizations/customizations for improved speeds, reliability, and/or coverage.

Peripherals 214 may include any device coupled to heterogenous computing platform 200 (e.g., sensors 110) through mechanisms other than USB/PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some cases, devices 212 and 213 may be coupled to internal interconnect fabric 203 via the same secondary interconnect serving devices 209-211 (not shown). Additionally, or alternatively, devices 212 and/or 213 may be coupled to internal interconnect fabric 203 via another secondary interconnect.

In various embodiments, one or more devices of heterogeneous computing platform 200 (e.g., GPU 204, aDSP 206, sensor hub and low-power AI device 207, high-performance AI device 208, VPU 211, etc.) may be configured to execute one or more AI model(s), simulation(s), and/or inference(s).

In some implementations, EC 215 may be integrated into heterogenous computing platform 200 of IHS 100. In other implementations EC 109 may be completely external to platform 200 (i.e., it may reside in its own semiconductor package) but coupled to integrated bridge 216 via an interface (e.g., enhanced SPI or "eSPI") to provide or maintain the EC's ability to access the SoC's internal interconnect fabric 203, including sensor hub 207 and sensor(s) 110, and to allow EC 109C to access and/or run most or all of devices 201-216 and 110 directly. In each of these scenarios, EC 109 may be configured to operate as an orchestrator instead of (or along with) sensor hub and low-power AI device 207.

In some embodiments, heterogeneous computing platform 200 may not include all the devices shown in FIG. 2. In other embodiments, IHS 100 may include other devices in addition to those that are shown in FIG. 2. Furthermore, some devices that are represented as separate components in FIG. 2 may instead be integrated with other devices, such that all or a portion of the operations executed by the illustrated devices may instead be executed by the integrated device.

As the inventors hereof have recognized, recent industry trends by major computer manufacturers indicate a push towards manufacturer-specific hardware (e.g., ICs, chips, etc.) and software (e.g., OS, etc.) level implementations that are likely to present barriers for Original Equipment Manufacturers (OEM) to continue to offer differentiated IHSs to their customers.

To address these, and other concerns, a firmware framework is presented below. This firmware framework may enable a selected device to serve as its intelligence center. In various embodiments, EC 109/215 may operate an orchestrator to enable firmware-level, system-wide management of devices and operations. As such, the firmware framework may take all (or part) of bare metal IHS 100 and transform it into a logic platform capable of addressing existing and future challenges with a foundation for extensibility (e.g., with reusable modules, standardized communication paths, etc.), independent of device manufacturers.

Figure 3:
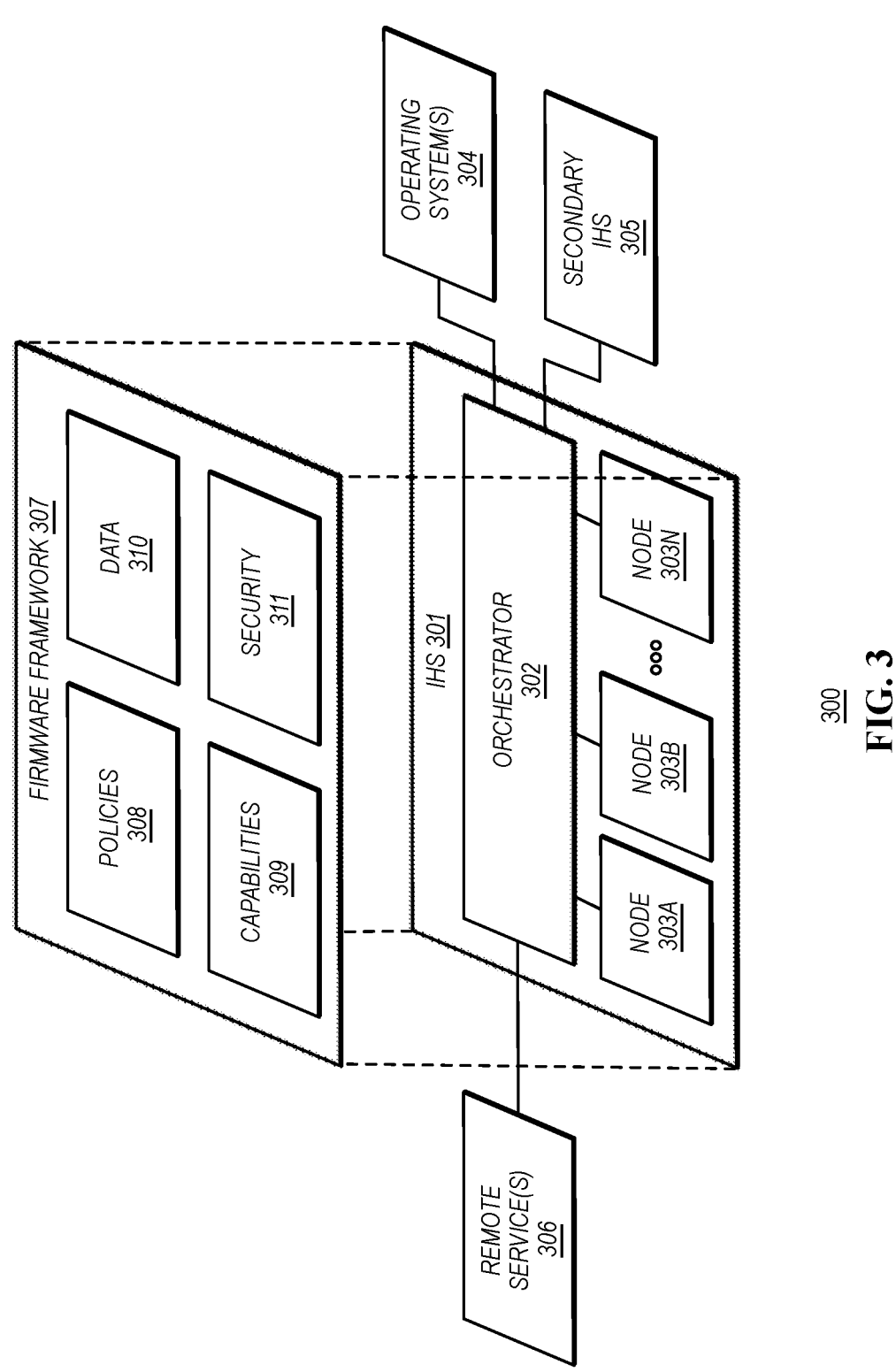
FIG. 3 is a diagram illustrating an example of a firmware framework, according to some embodiments.

FIG. 3 is a diagram illustrating an example of architecture 300 upon which firmware framework 307 may be instantiated through the execution of firmware by a plurality of devices or components (e.g., controllers, processors, processing cores, etc.), such as those shown in FIGS. 1 and 2. As described, IHS 301 includes at least two types of participants: orchestrator 302 and nodes 303A-N.

Orchestrator 302 may serve as a Root-of-Trust (ROT) for firmware framework 307. Meanwhile, nodes 303A-N provide capabilities owned within firmware framework 307. For example, in IHS 100 equipped with heterogeneous computing platform 200, EC 109/215 may implement orchestrator 302 and any of devices 201-216 may implement any of nodes 303A-N.

Orchestrator 302 may also be in communication with any number of firmware framework consumers. As shown in architecture 300, consumers may include: OS(s) 304 (executed by host processor 101), secondary IHS 305, and remote service(s) 306. In some cases, OS(s) 304 may be coupled to orchestrator 302 via an in-band communication channel. Secondary IHS 305 may be coupled to orchestrator 302 via a sideband communication channel. And remote service(s) 306 may be coupled to orchestrator 302 via an Out-of-Band (OOB) communication channel.

Once orchestrator 302 and nodes 303A-N execute their respective firmware, they instantiate firmware framework 307. In this case, components of firmware framework 307 include: policies module 308, capabilities module 309, data module 310, and security module 311. Each of modules 308-311 may be implemented as one or more services, such as orchestration services 601 of orchestrator 302 and node services 603 of nodes 303A-N, as described in FIG. 6 below.

Particularly, policies module 308 may include one or more policies configured to enable firmware framework 307 to operate as configured by a user, OEM, ITDM, or third-party. In some cases, policies module 308 may be responsible for configuring aspects of firmware framework 307 related to device, capability, and interface discovery and advertisement, as well settings related to security, telemetry collection, and more, as described in more detail below.

Capabilities module 309 may include operations and functions performable by firmware framework 307. Such capabilities may include operations such as advertising, broadcasting, discovering, configuring, collecting data, updating firmware, controlling power states and performance levels, accessing memor(ies) and network(s), executing AI/ML models, any device-specific operation (e.g., provided by each of nodes 303A-N), etc. Capabilities module 309 may also include an indication of the interfaces (e.g., APIs) available for consumers, orchestrators, and other nodes to access the respective capabilities of available nodes.

Data module 310 may include any data, drive, memory, and/or database handling service usable by firmware framework 307 as part of its normal operations. For example, data module 310 may include a firmware framework manifest or inventory identifying all nodes available to firmware framework 307 (e.g., orchestrator 302 and nodes 303A-N), their relevant details, and indications of their hierarchical connection topologies (e.g., parent node, child node, etc.). Data module 310 may also include telemetry data, communication data, error and diagnostics data, performance data, AI/ML model data (e.g., training data), etc.

Security module 311 may implement various security aspects of firmware framework 307. For example, security module 311 may implement firmware attestation, inter-node communications, and communications between firmware framework 307 and consumers 304-306. Operations performed by security module 311 may include, but are not limited to, data encryption, data decryption, hashing, data masking, cryptographic key pair generation, digital certificate generation and handling, authentication, verification, etc.

In various embodiments, firmware framework 307 may provide secure communication paths for all firmware communications within IHS 100, and in some cases extended to secondary IHSs or other peripheral devices coupled to IHS 100. Firmware framework 307 may deliver scalable discoverability and communication pathways without OS dependencies (e.g., drivers, agents, etc.), and it may reduce an OEM's need for custom integration designs.

In addition to providing communications across disparate devices (e.g., from different manufacturers) using standard protocols, firmware framework 307 may implement runtime modules that are reusable. Accordingly, certain capabilities (e.g., discovery, security, capabilities, status, pass-through configurations, docking, etc.) may be made standard across different types of IHSs in its firmware layer, and in a hardware and/or OS agnostic-manner.

Moreover, in some implementations, consumers 304-306 may have access to aspects of firmware framework 307 directly through orchestrator 302 (e.g., capabilities module 309, data 310 module, etc.). OS 304, secondary IHS 305, and/or remote service(s) 306 may communicate with orchestrator 302 in band, sideband, or OOB, respectively, to issue commands to selected devices, collect telemetry, update firmware, etc. through firmware framework 307.

Figure 4:
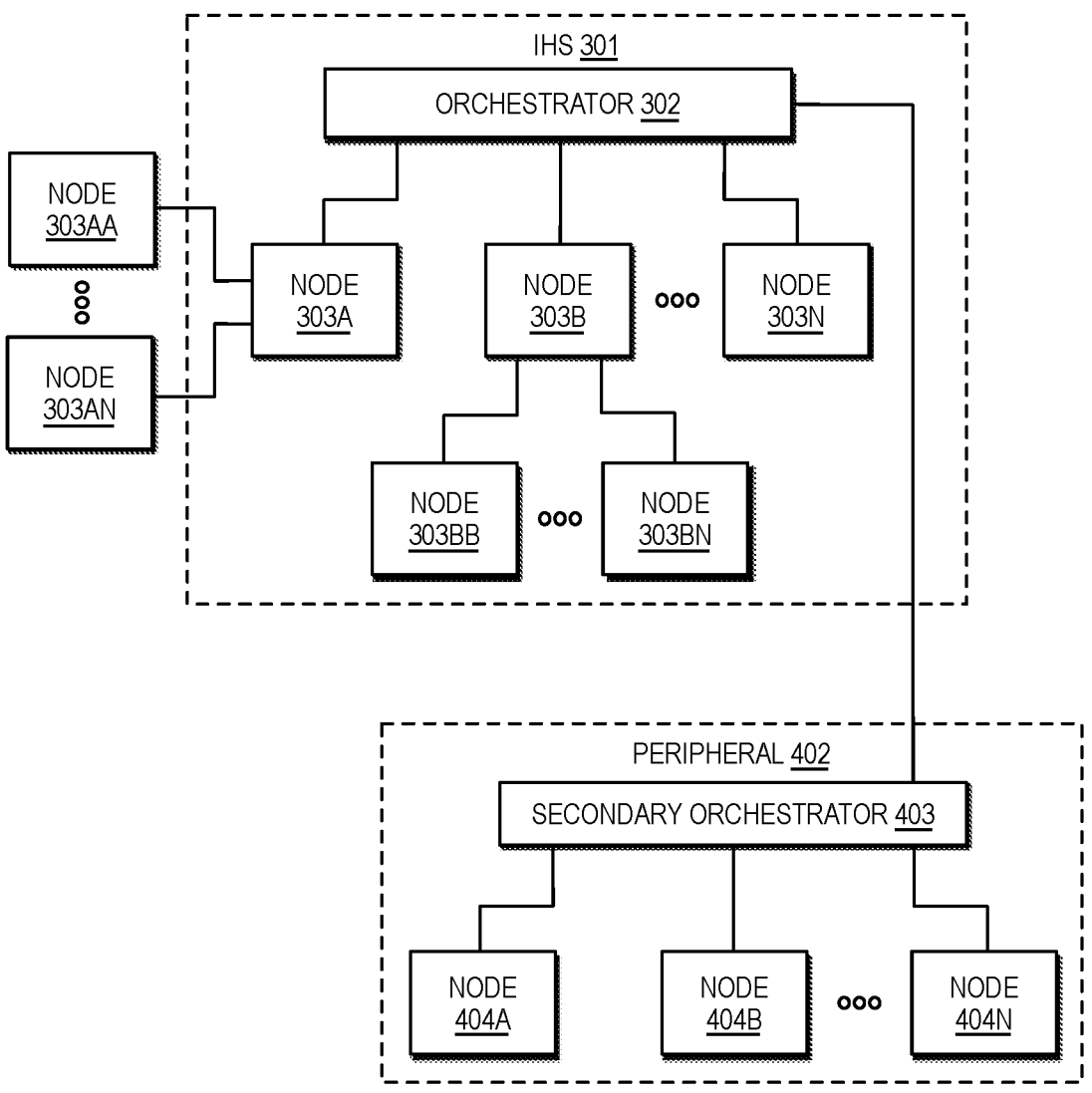
FIG. 4 is a diagram illustrating an example of a hierarchical node architecture, according to some embodiments.

FIG. 4 shows an example of a hierarchical node architecture 400 where nodes 303A-N are coupled to other nodes and orchestrators to form a larger hardware layer capable of producing firmware framework 307. It should be noted that, in general, node architectures may be application, use, and/or context specific, therefore hierarchical node architecture 400 is provided for sake of illustration only, and multiple variations are envisioned.

In this implementation, orchestrator 302 is coupled to nodes 303A-N. External nodes 303AA-AN (outside of the IHS's chassis) are coupled to node 303A, such that node 303A is a parent node ("upstream") with respect to external nodes 303AA-AN ("downstream"). Conversely, external nodes 303AA-AN are child nodes with respect to node 303A.

Connections, buses, interconnects, and communication protocols between orchestrator 302, nodes 303A, and/or nodes 303AA-AN, may follow any suitable standard. For example, in some cases, a USB controller (e.g., USB/PCIe interface 205) may implement node 303A, and any external USB device coupled to node 303A via a USB port may implement any of nodes 303AA-AN.

Nodes 303BB-BN are coupled to node 303B, such that node 303B (an "upstream" node) is a parent node with respect to nodes 303BB-BN (a "downstream" node), and nodes 303BB-BN are child nodes with respect to node 303B. In some cases, for example, sensor hub and low power AI 207 may implement node 303A, and nodes 303BB-AN may represent any internal device or sensor(s) 110 coupled to node 303B via an internal interconnect (e.g., interconnect 203), or the like.

In hierarchical node architecture 400, orchestrator 302 is also coupled to secondary orchestrator 403 of peripheral device 402. For example, peripheral device 402 may include a docking station, hub, or display comprising its own EC (like EC 109/215). Additionally, or alternatively, peripheral device 402 may include another type of processor or controller that may be configured to operate, at least in part, as an EC.

Orchestrator 302 may aggregate interfaces and capabilities reflective of nodes 303A-N and their respective child nodes (e.g., nodes 303AA-AN and/or 303BB-BN), whereas secondary orchestrator 402 may aggregate interfaces and capabilities reflective of nodes 403A-N. Parent nodes 303A and 303B may also serve as aggregators; however, in some cases, they may be bypassed by orchestrator 302 when managing child nodes 303AA-AN and 303BB-BN directly.

Orchestrator 302 may also serve as "primary orchestrator" within firmware framework 307. Particularly, orchestrator 302 may manage the operations of secondary orchestrator 402, thereby extending the number of devices participating in firmware framework 307, exposing their interfaces and capabilities, delegating (or being delegated) certain tasks, etc. For example, secondary orchestrator 402 may perform discovery operations with respect to nodes 404A-N, and it may report its own inventory and/or manifest (of child devices, capabilities, and/or interfaces) to primary orchestrator 302 for addition and/or removal of devices to/from firmware framework 307.

Secondary orchestrator 403 is coupled to nodes 404A-N, here shown as integrated or internal to peripheral device 401. In other applications, however, one or more nodes 404A-N be external to peripheral device 401.

Any node external to IHS 301, including nodes 303AA-AN as well as nodes that are part of peripheral 402 (or coupled thereto), may be added to or removed from architecture 400 while IHS 301 is operating, such that orchestrator 302 may adjust firmware framework 307 on demand, refreshing or updating the framework's capabilities, interfaces, etc., as devices are swapped in and out.

Figure 5:
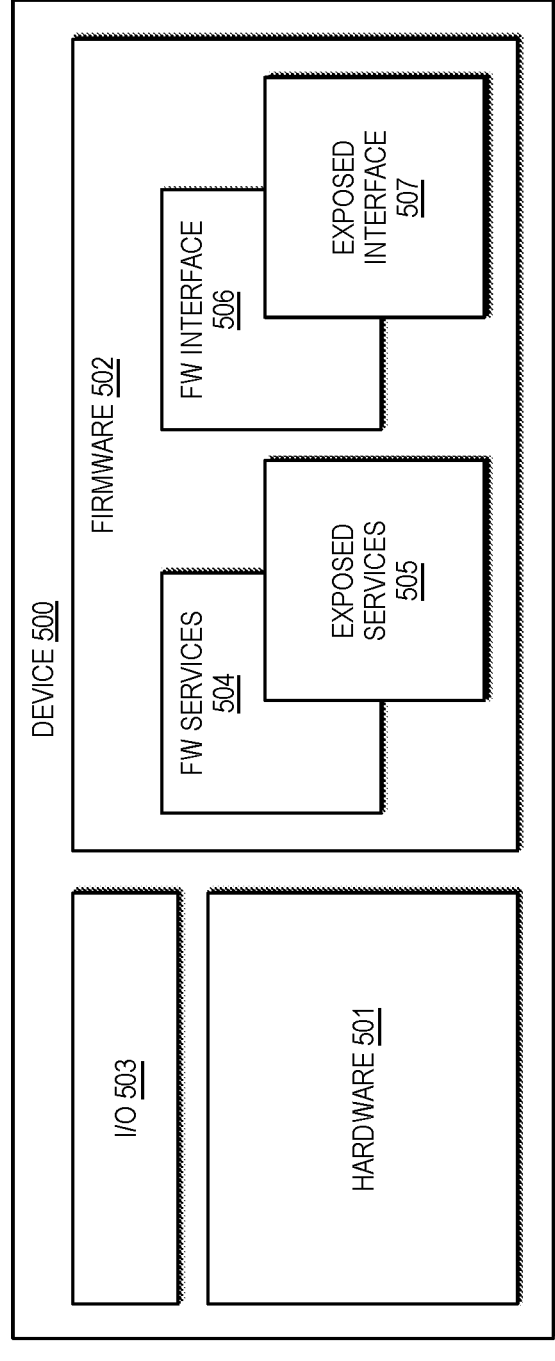
FIG. 5 is a diagram illustrating an example of an orchestrator or node usable in a hierarchical device architecture as part of the firmware framework, according to some embodiments.

FIG. 5 is a diagram illustrating an example of orchestrator 302 or node 303 ("node"). In various embodiments, node 302/303 may implement any of the orchestrators and/or nodes described above. In implementations where a single or monolithic piece of hardware (e.g., a chip) includes or otherwise operates as two or more nodes, components of node 302/303 may be apportioned or split between two or more "virtual devices," each virtual device corresponding to a respective node. In other implementations, however, two or more discrete pieces of hardware may operate together to form a single framework node.

In this implementation, node 302/303 includes device 500, which in turn includes hardware 501 and I/O 503. Specifically, I/O 503 may include any suitable port or connection responsible for communications to and from node 302/303, including messages and data exchanged as part of firmware framework 307.

Hardware 501 may include a chip, a processor, a controller, a processing core, or any suitable circuit configured to execute the operations provided by node 302/303, and it may also include a memory and other components. Moreover, hardware 501 may be configured to execute firmware instructions or code 502, and to thereby produce one or more components and/or features of firmware framework 307.

Particularly, firmware instructions 502, upon execution by hardware 501, may produce firmware services 504 and firmware interface 506.

Firmware services 504 may include functions or operations that run on, or can be executed by, device 500 to enable it to participate in firmware framework 307 as orchestrator 302 and/or nodes 303. These operations may include OEM as well as device manufacturer features such as, for example: sensor handling, telemetry collection, presence detection, shock detection, AI/ML models, routines, etc. Meanwhile, exposed services 505 may include a subset of firmware services 504 (and/or other services) responsible for executing functions and operations exposed to firmware framework 307 including orchestration services (discovery, capability, telemetry, security, etc.) and node services.

Firmware interface 506 provides an interface layer that includes methods, functions, and operations configured to enable internal and external communications into or from node 302/303 that reach into (and/or out of) firmware services 504 and/or exposed services 505. Exposed interface 507 (e.g., APIs) include a subset of firmware interface 506 (and/or other services) responsible for connecting to and supporting framework-specific interfaces, as well as for translating commands across standard communication interfaces, to/from a device's lower layer(s) to framework firmware 307.

Figure 6:
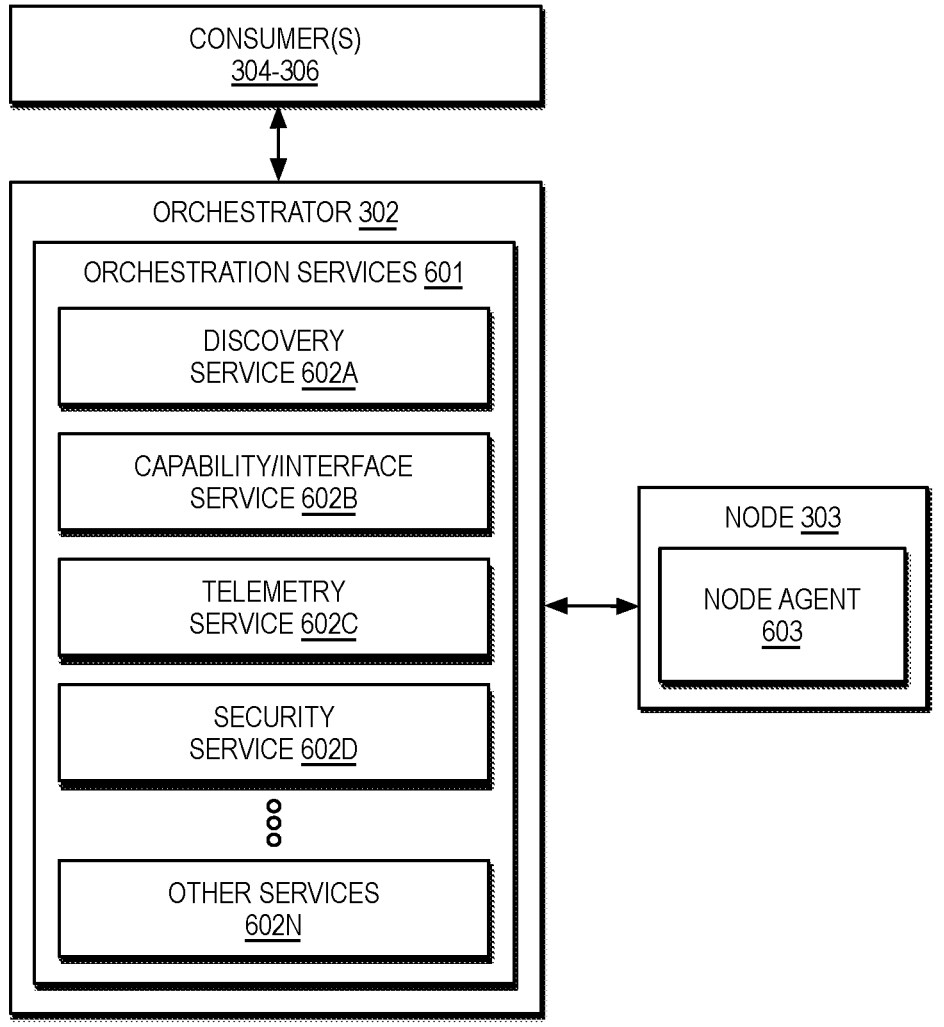
FIG. 6 is a diagram illustrating examples of orchestration services in communication with a node agent, according to some embodiments.

FIG. 6 is a diagram illustrating examples of orchestration services 601 in communication with node agent 603. In this embodiment, upon execution of firmware 502 to instantiate firmware services 504 and/or exposed services 505, orchestrator 302 may provide orchestration services 601 including, for example, discovery service 602A, capability/interface service 602B, telemetry service 602C, security service 602D, and other services or agents 602N.

Meanwhile, upon execution of firmware 502 to instantiate firmware services 504 and/or exposed services 505, node 303 may provide node services or agent 603 configured to communicate with orchestration services 601 to send and receive control and/or data messages within firmware framework 307.

For example, discovery service 602A of orchestration services 601 may communicate with node agents 603 to perform one or more discovery operations (e.g., device, capabilities, interfaces, etc.). Capability/interface service 602B of orchestration services 601 may communicate with node agents 603 to perform one or more capability/interface handling operations (e.g., consolidation of capabilities in a common namespace, advertisement, access control, etc.). Telemetry service 602C of orchestration services 601 may communicate with node agents 603 to perform one or more telemetry collection, aggregation, or processing operations. Security service 602D of orchestration services 601 may communicate with node agents 603 to perform one or more security operations.

Once instantiated, consumers 304-306 may access orchestration services 601 directly through orchestrator 302, without relying on any host OS of IHS 100. Unless configured to receive or transmit private communications with certain nodes that are intended to bypass orchestrator 302, consumers 304-306 may ordinarily access any node agent 603 through orchestration services 601. Conversely, node services 404 may access consumers 304-306 through orchestration services 601; in some cases, bypassing orchestrator 302.

Figure 7:
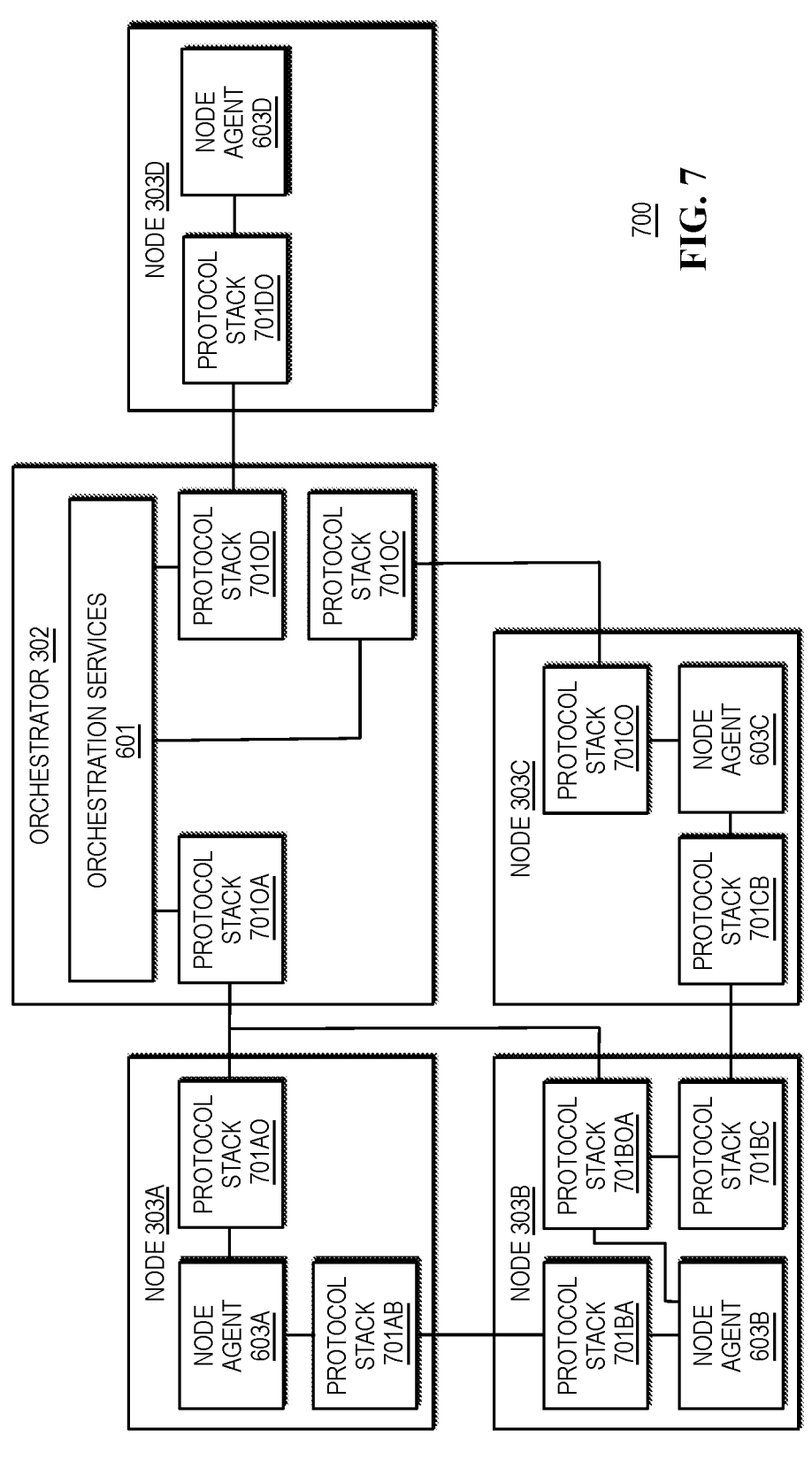
FIG. 7 is a diagram illustrating an example of a graphical representation of orchestrators and nodes participating in a firmware framework implementation, according to some embodiments.

FIG. 7 is a diagram illustrating an example of graphical representation 700 of orchestrator 302 and nodes 303A-D participating in an implementation of firmware framework 307. In this scenario, graphical representation 700 includes orchestrator 302 coupled directly to nodes 303A-D. Node 303A is coupled to node 303B, and node 303B is coupled to node 303C.

Specifically, orchestrator 302 executes orchestration service 601 in firmware, while each of nodes 303A-D instantiates its own node agent 603A-D. Orchestration services 601 may use: (i) protocol stack 701OA to communicate with protocol stack 701AO used by node agent 603A of node 303A; (ii) protocol stack 701OA to communicate with protocol stack 701BOA used by node agent 603B of node 303B; (iii) protocol stack 701OC to communicate with protocol stack 701CO used by node agent 603C of node 303C; and/or (iv) protocol stack 701OD to communicate with protocol stack 701DO used by node agent 603D of node 303D.

Node 303A uses protocol stack 701AO to communicate with protocol stack 701OA of orchestrator 302, and it uses protocol stack 701AB to communicate with protocol stack 701BA of node 303B. Meanwhile, node 303B uses protocol stack 701BOA to communicate both with protocol stacks 701AB of node 303A and protocol stack 701OA of orchestrator 302, and it uses protocol stack 701BC to communicate with protocol stack 701CB of node 303C.

Node 303C uses protocol stack 701CO to communicate with protocol stack 701OC of orchestrator 302, and it uses protocol stack 701CB to communicate with protocol stack 701BC of node 303B. Moreover, node 303D uses protocol stack 701DO to communicate with protocol stack 701OD of orchestrator 302.

In some cases, protocol stacks 701OA, 701AO, and 701BOA may include a first communication protocol, protocol stacks 701AB and 701BA may include a second communication protocol, protocol stacks 701BC and 701CB may include a third communication protocol, protocol stacks 701OC and 701CO may include a fourth communication protocol, and protocol stacks 701OD and 701DO may include a fifth communication protocol. The first, second, third, fourth, and fifth communication protocols may be different from each other.

For example, the first protocol may be I²C, the second protocol may be I³C, the third protocol may be USB, the fourth protocol may be a wireless protocol (e.g., Bluetooth), and the fifth protocol may be eSPI.

In some cases, each of protocol stacks 701 may be selected by orchestration services 601 based upon policy and/or context. For example, in situations where multiple protocol stacks may be available for a same inter-node connection, orchestration services 601 may direct each participating node 303 to instantiate a selected protocol stack depending upon the type of node, the present utilization of alternative communication paths, a battery charge level of IHS 100, a location of IHS 100, a security posture of IHS 100, a performance state of IHS 100, or any of the contextual information or state described herein.

Each of node agents 603 may communicate with orchestrator services 601 and other agents 303 as part of a session. Each session may be established based upon policy and/or context, and without the participation of any OS. For example, any given node 303 may be part of firmware framework 307 only for the duration of its established session.

In some cases, two or more orchestration services 601 may communicate using the same protocol stack. In other cases, each orchestration service 601 may communicate with node services 602 using a different protocol stack. In yet other cases, a single orchestration service 601 may use two or more protocol stacks concurrently.

Graphical representation 700 may be stored in data module 310 of firmware framework 307, for example, in the form of a table that identifies each node, node agent, protocol stack, and the topology of the connections between nodes. As such, graphical representation 700 may be displayed on an ITDM/OEM/user's display when evaluating the current state of firmware framework 307 (e.g., participating nodes, capabilities, interfaces, security posture, etc.)

In some cases, upon completion of a discovery process (described below), graphical representation 700 may also indicate (e.g., with colors, labels, etc.) whether a given node is classified as an aggregator node, collector node, or a node to be bypassed (a "bypass node") during message exchanges across firmware framework 307.

Figure 8:
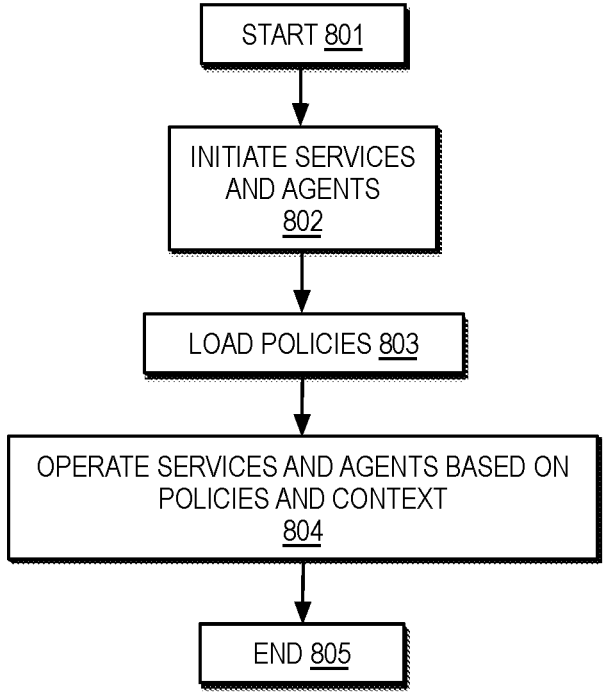
FIG. 8 is a flowchart of an example of a method for operating orchestration services and node agents as part of a firmware framework, according to some embodiments.

FIG. 8 is a flowchart of an example of method 800 for operating orchestration services 601 and node agents 603 as part of firmware framework 307 to produce modules 308-311. Method 800 starts at 801.

At 802, orchestrator 302 initiates orchestration services 601 and node 603 initiates node agent 603, respectively, by executing their respective firmware instructions 502. At 803, orchestrator 302 may load a policy, such as a discovery, capability, interface, telemetry, data, communication, or security policy. At 804, orchestrator 302 may operate any orchestration service 601 while enforcing such polic (ies).

Each policy may include rules that depend upon context (e.g., sensor data, TPPA data, IHS configuration data, device usage data, power state, performance data, location, network metrics, etc.), therefore allowing OEMs and ITDMs to enable any number of intelligent productivity, security, and value-added features within firmware framework 307 dynamically and without relying on an the operation of any OS. Method 800 ends at 805.

OS Discovery and Interaction

In some applications, certain IHS operations may rely upon interactions between two or more devices or components. For example, in certain situations, sensors 110 may include an Ambient Light Sensor (ALS), and the brightness of display 111 may be automatically adjusted in response to changes in ambient light. In other situations, an IHS's cooling fans may be configured to respond to a display's current resolution, color depth, or frame rate.

In a conventional IHS, EC 109/215 would require one or more custom sideband General Purpose I/Os (GPIOs) and/or OS agents to discover these devices and to enable communications between them. In contrast, firmware framework 307 may discover participating nodes directly, via firmware, and without interference from OS agents or dedicated GPIOs.

In addition, with firmware framework 307, there are a lot of complex capabilities that are advertised within the firmware framework system. All the different devices can communicate with each other, and actually configure and execute individual functions. As the firmware framework starts to scale-up, it becomes necessary to have a managed oversight.

Therefore, in order to have managed oversight, in some embodiments, an OS level application can get access to the firmware framework 307 status and capabilities in a scalable and discoverable manner. The firmware framework can dynamically provide a list of all firmware capabilities to the host application in a dynamic and extensible fashion. The OS level application can actually interact with some of these functions in the firmware framework, such as a get function or a specific set capability within the framework. In order to have managed oversight, an OS level application can also get access to all the functions and capabilities of the firmware framework, in some embodiments.

Figure 9:
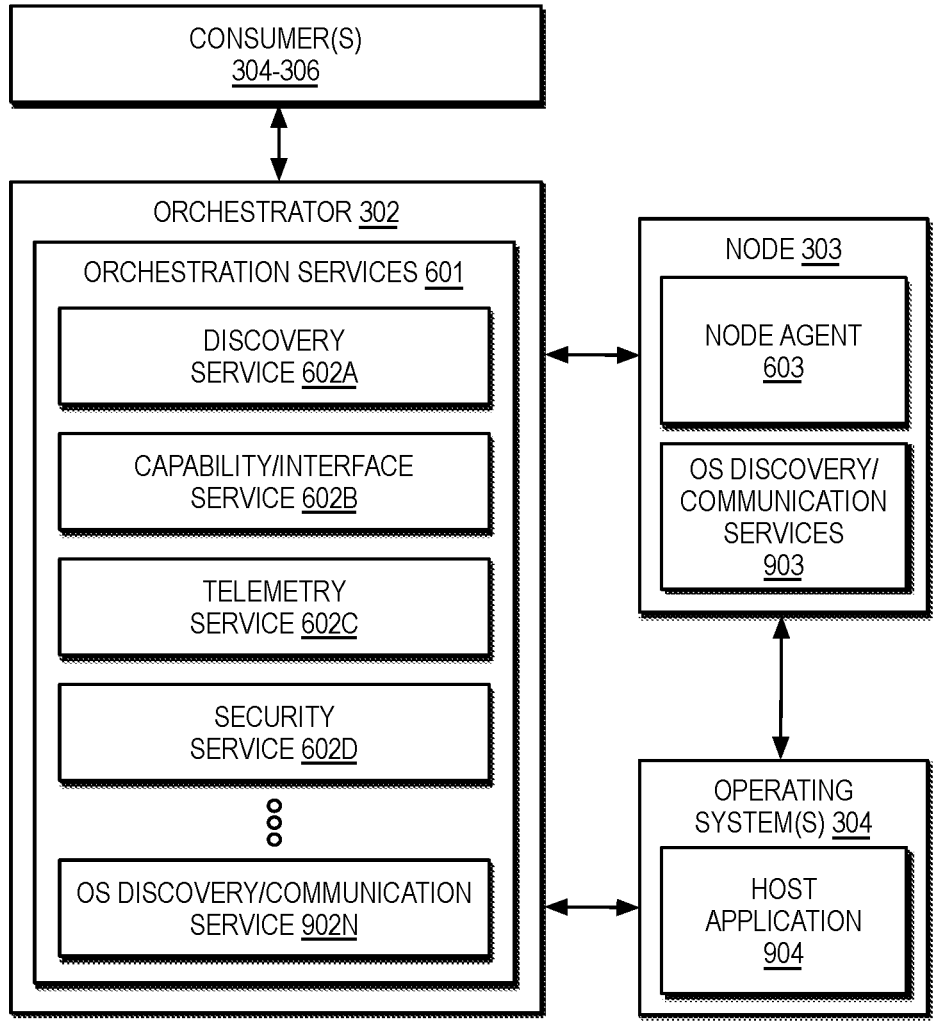
FIG. 9 is a diagram illustrating examples of orchestration services in communication with both a node agent and a host application of an operating system, according to some embodiments.

FIG. 9 is a diagram illustrating examples of orchestration services 601 in communication with both a node agent 603 and a host application 904 of an operating system 304, along with the operating system 304 in communication with the node 303, according to some embodiments.

In this embodiment, upon execution of firmware 502 to instantiate firmware services 504 and/or exposed services 505, orchestrator 302 may provide orchestration services 601 including, for example, discovery service 602A, capability/interface service 602B, telemetry service 602C, security service 602D, and OS discovery and/or communication services 902N.

Meanwhile, upon execution of firmware 502 to instantiate firmware services 504 and/or exposed services 505, node 303 may provide node services or agent 603 configured to communicate with orchestration services 601 to send and receive control and/or data messages within firmware framework 307. In addition, node 303 may provide OS discovery/communication services 903 in order communicate with the operating system(s) 304. In addition, operating system(s) 304 may also communicate with orchestration services 601, and in particular, OS discovery and/or communication services 902N, in order to send and receive control and/or data messages within firmware framework 307.

More specifically, a specific node can be identified and assigned to enumerate a common device type to the host operating system(s) 304. The host operating system(s) 304 can then effectively become a node within the framework itself, albeit an outside consuming node. The specific node would then be able to advertise capabilities to the host operating system(s).

Therefore, an OS level host application 904 might want to get information of the current system security state of the firmware framework 307, as an example, where the current system security state has been identified through different communication patterns within the firmware framework. In such a situation, one of the nodes could advertise a device to the host operating system(s) 304. The host application 904 could talk to that node using well-defined APIs, and get the current state of the system security.

If the node were an orchestrator 302, for example, then the orchestrator could, based on policy, determine the current evaluated state. Having the host application 904 call into the node that's actually performing all of the orchestration (e.g., orchestrator 302) can provide some level of efficiency. The orchestrator could determine the state of connected devices, the network location security, the security policy of the hardware devices, if users are present, and other types of information. The orchestrator can then can actually tell the higher-level host application 904 the current evaluated state. This can occur via the OS discovery and/or communication services 902N of the orchestration services 601 of the orchestrator 302, for example.

This setup can be very powerful for telemetry activities, for example. When these operations are actually made at the framework level, where it's a system level configuration and not explicitly a device level, it will be very important for that data to be accessed to the application in an intelligent fashion.

In addition, allowing the host application 904 to communicate with a non-orchestrator node, such as node 303 for example, can give secure insulation from directed open-ended attacks into the orchestration. The host application 904 can communicate with any device that has a service, that advertises the framework endpoint to the operating system(s) 304. In such embodiments, the framework status and capability information can be shared between different nodes of the firmware framework (e.g., 303A-N), allowing the host application 904 to communicate with a different device. This can occur via the OS discovery and/or communication services 903 of the node 303, for example. Therefore, if there was a denial of service attack on the orchestrator 302, the host application 904 can communicate with a non-orchestrator node, such as node 303 for example.

Therefore, when the host application 904 calls into the firmware framework 307, it doesn't necessarily know (or care) that it's calling into the framework orchestrating node 302, or if it's in one of the other different nodes (e.g., node 303). The host application 904 is just communicating with a node to get information, determine what it is allowed to get, determine what it is allowed to configure, and determine the status of the framework.

Discovery

In various embodiments, firmware framework 307 may be configured to execute discovery service 602A as part of orchestration services 601. Discovery service 602A may identify which orchestrators and nodes may join and become part of firmware framework 307. Discovery service 602A may also produce a firmware framework manifest of all participating orchestrators and nodes, with identification details (e.g., serial number, type of device implementing a given node, etc.) as well as their available capabilities and interfaces. The firmware framework manifest may also indicate hierarchical relationships or architectural topologies between orchestrators and nodes.

When performing discovery for communication to an operating system(s) 304, Discovery service 602A may also provide detailed state information which can include, but is not limited to, the system device, the orchestrator node, the distance and/or latency from the system-wide orchestrator node, the capability per node on the device, and/or policy, along with other types of detailed state information.

Discovery service 602A may be configured to communicate with all nodes via scaled interfaces (e.g., I²C, SPI, I³C, etc.) between orchestrator 302 and those nodes. Meanwhile, each node 303 may execute its own firmware to instantiate its own node agent 603 within firmware framework 307. Node service or agent 603 may be configured to operate in conjunction with discovery service 602A, for example, by responding to requests (or by broadcasting its own discovery messages) to enable orchestrator 302 to enumerate (and advertise, within firmware framework 307) its capabilities and interfaces.

In addition, OS discovery service (902N, 903) may be configured to communicate with all nodes via scaled interfaces (e.g., I²C, SPI, I³C, etc.) between orchestrator 302 and those nodes. Node service or agent 603 may be configured to operate in conjunction with the OS discovery service (902N, 903), for example, by responding to requests (or by broadcasting its own discovery messages) to enable orchestrator 302 to enumerate (and advertise, to operating system(s) 304) its capabilities and interfaces.

Discovery service 602A may be responsible for device communication and querying of system states to node services or agent 603. In some cases, node services or agent 603 may broadcast node information to the discovery service via exposed interface 507. Additionally, or alternatively, discovery service 602A may issue discovery requests to node services or agent 603, and it may receive discovery responses from it, also via exposed interface 507.

Likewise, OS Discovery service (902N, 903) may be responsible for device communication and querying of system states to node services or agent 603. In some cases, node services or agent 603 may broadcast node information to the OS Discovery service (902N, 903) via exposed interface 507. Additionally, or alternatively, OS Discovery service (902N, 903) may issue discovery requests to node services or agent 603, and it may receive discovery responses from it, also via exposed interface 507.

The discovery responses by a node services or agent 603 may include, but are not limited to: an identifier, a serial number, a service tag, a type of device, capabilities (e.g., functions, operations, transactions, calls, etc., that the device is configured to perform), interfaces (for accessing the capabilities), etc. With regard to information for communication to an operating system(s) 304, the discovery responses by a node services or agent 603 may include, but are not limited to: system manifest and capabilities list (for some or all nodes and capabilities), orchestrator node identification and distance, device enumeration for some or all nodes on the system (e.g., OS discoverable node), and advertisable functions to be configured by an OS agent. In some cases, node information provided by a parent node may also include node information of child nodes downstream from the parent node.

Discovery service 602A may then consolidate discovery responses from all node services or agents 603 of all nodes, and it may assemble them to produce a manifest or inventory of all connected devices and available capabilities within firmware framework 307. This manifest or inventory and associated data may be stored in and/or handled by data module 310.

Likewise, OS Discovery service (902N, 903) may consolidate discovery responses from all node services or agents 603 of all nodes, and it may assemble them to produce a manifest or inventory of all connected devices and available capabilities within firmware framework 307. This manifest or inventory and associated data may be stored in and/or handled by data module 310. This manifest or inventory may also be communicated to a host application 904 of an operating system(s) 304.

In some cases, discovery service 602A or OS Discovery service (902N, 903) may enforce a policy provided by policies module 308. The policy may be expressed in any suitable format (e.g., Extensible Markup Language or "XML," JavaScript Object Notation or "JSON," etc.), and it may include rules for discovering devices and/or types of devices (e.g., orchestrators or nodes). Policy rules may prescribe, for example, whether a discovery process should happen by polling or broadcast, a polling order or method, a choice of selected one of a plurality of available communication buses or protocols for discovery messages, etc. In some embodiments, the policy may be set by a host application 904 of an operating system(s) 304.

In some cases, such policy rules may be provided by an OEM or ITDM, and/or may be selected by a user of IHS 100 and/or may be provided by the operating system(s) 304 or a host application 904 of an operating system(s) 304. Moreover, these rules may be context-based (e.g., different rules may apply depending, for example, upon the IHS's power state, battery charge, whether the IHS is moving, a location of the IHS, a time of day, weather conditions, bag or lid state, IHS posture or form factor, calendar information of a user of the IHS, or any other contextual information or state described herein).

Node agent 603, when executed by a respective one of nodes 303A-N, 303AB-AN, 303BA-BN, 403, and/or 404A-N, may communicate with discovery service 602A or OS Discovery service (902N, 903) via a protocol or bus, which may be selected dynamically and/or by policy. Node agent 603 may transmit messages indicating its exposed capabilities and interfaces to discovery service 602A or OS Discovery service (902N, 903), as well as any connected and/or available child nodes and their configurations. In cases where primary orchestrator 601 discovers secondary orchestrator 403 (or vice-versa), these orchestrators may each have their own discovery services, which may communicate with each other similarly as discovery service 602A and node agent 603.

In some implementations, communications sent to or from node agent 603 may be in a scaled package that presents a full list of device information, capabilities, interfaces, etc. For instance, in response to a discovery request by discovery service 602A, consider the discovery response example below provided by node agent 603 of a node implementing a presence detection sensor (e.g., one of sensors 110), presented in a JSON format:

```
{
  "comments": "API spec for Core IPC Object", //internal
    IPC methods
  "auth_token": "rt12342d",
  "container_id": "abcd",
  "platform_id": "p5435",
  "conditions": [{
    "type": "IPC",
    "handle to policy": "void *ptr",
    "IPCMethod": "UNIX", //example
    "IPCVersion": "XX",
    "registered object auth tokens": ["t1", "t2", . . . ]
```

```
}, {
"type": "sensors",
"Devicetype": "presence",
"presencetype": "face",
"presence": "engaged",
"attention": "disengaged",
"distance": "50 cm",
}]
}
```

Likewise, in some implementations, communications sent to or from a host application 904 of an operating system(s) 304 may be in a scaled package that presents a full list of device information, capabilities, interfaces, etc. For instance, in response to a discovery request by a host application 904 of an operating system(s) 304, consider the discovery response example below provided by OS Discovery service (903) of a node implementing a sensor hub (e.g., sensor hub 207), presented in a JSON format:

```
{
comments": "Dell Firmware Framework Manifest Device
    ABC",
"auth_token": "rt1234",
"container_id": "1234",
"platform_id": "2345",
"device_id": "ABC",
"self": {"
    type": "Sensor Hub",
    "Vendor": "Intel",
    "mode": "node", //orchestrator vs. node
    "FW":
        {"
        Device_version": "ABDC",
        "RTOS": "Zephyr",
        "build_date": "MM/DD/YYYY:HH:SS:MM"
        "modules": [m1, m2, m3]{"version": "XYZ",
            "type": "telemetry", . . . }
        }
    }
"distance_from_orchestrator": {
    "hop": "1" //numbers of connections to the orchestrator
    "latency": "500 ms" //expected time between devices
    }
"Children": {
    "device_ID": "3535"
    }
"System_Manifest": ["SM1", "SM2", "SM3" . . . ]{
    "device_id": "alkadsf",
    "dev_disc": "yes" //discoverable by OS?
    "capability": "QRT"
    }
}
```

As discovery service 602A or OS Discovery service (902N, 903) collects responses from various nodes 303A-N, 303AB-AN, 303BA-BN, 403, and/or 404A-N, it may assemble a firmware framework manifest of all within firmware framework 307.

For instance, consider a firmware framework manifest example produced by the discovery service and presented below without specific formatting (for simplicity):

```
System
    IHS Information
    Orchestrator
        INFO: ID/Info/Version/etc.
        Device Capabilities
            Cap_1
                Type: Get/SET/Execute/Listen
                Schema: details of function call
```

```
                Cap_2,
                Cap_3,
        Child nodes
            Child_Dev1
                INFO: ID/Info/Version/etc.
                Device Capabilities
                Child nodes
                    Child_Dev1
                    Child_dev2
            Child_Dev2
            . . .
            Child_Dev3
            . . .
            Child_Dev4
            . . . .
```

Figure 10:
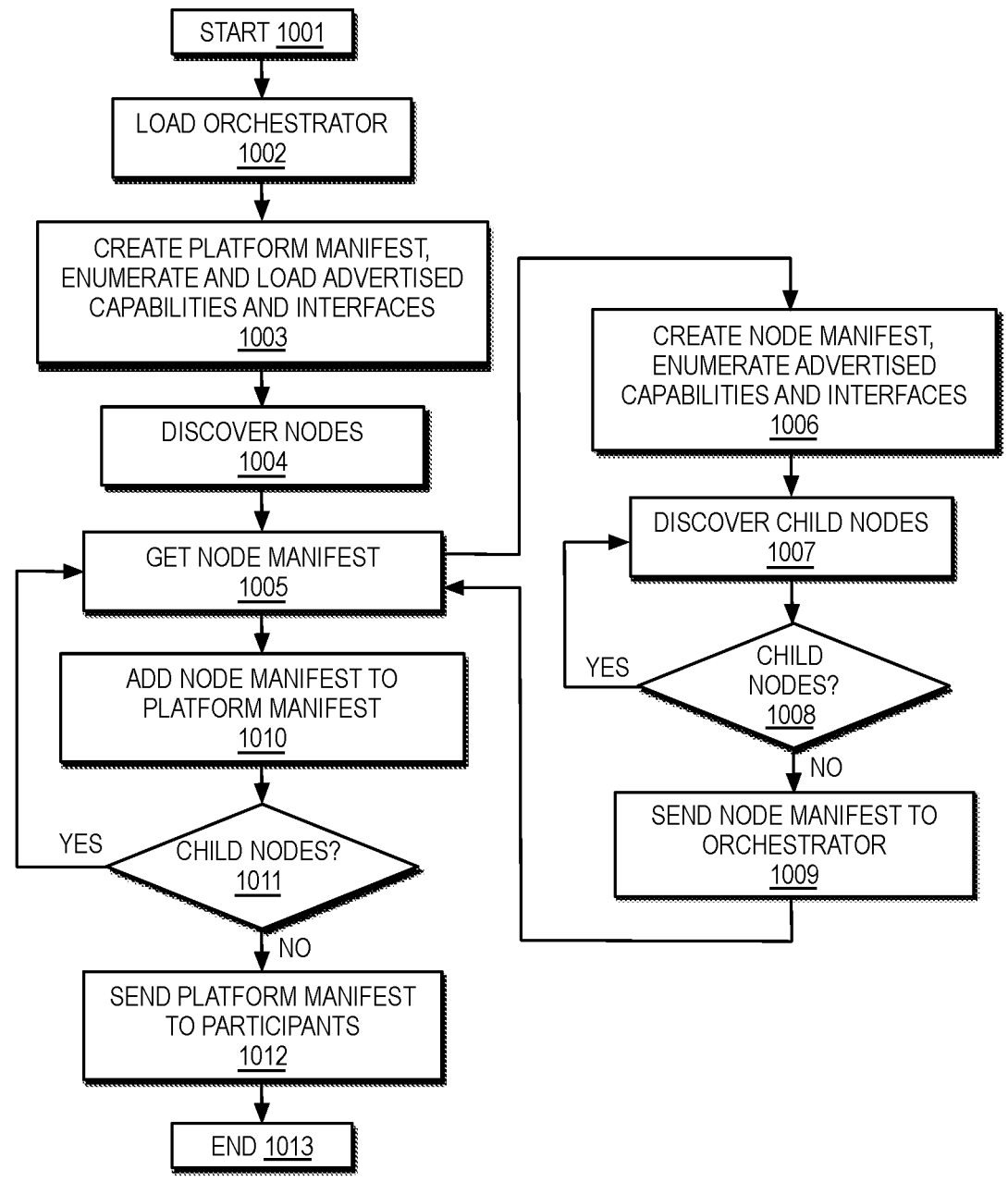
FIG. 10 is a diagram illustrating an example of a method for discovery operations, according to some embodiments.

FIG. 10 is a diagram illustrating an example of method 1000 for discovery operations. In various embodiments, method 1000 may involve interactions between firmware services instantiated by orchestrator 302, such as discovery service 602A or OS Discovery service (902N, 903), and nodes 303A-N, 303AB-AN, 303BA-BN, 403, and/or 404A-N, such as node agent 603.

Method 1000 may take place within firmware framework 307 without any involvement by any OS 304, OS driver, or OS agent. In some cases, firmware framework 307 may operate in the absence of any OS, or before any OS boots (or completes its startup/wakeup processes). To that end, method 1000 may be performed over interconnect 203 and/or other standard communication buses and protocols, without relying on custom GPIOs for inter-device/node communications.

In operation, method 1000 begins at 1001. At 1002, orchestrator(s) 302 and/or 403 execute their respective firmware 302 to instantiate discovery service 602A as part of capabilities module 309 of firmware framework 307. At 1003, discovery service 602A creates a firmware platform manifest and enumerates and loads advertised capabilities and interfaces.

At 1004, discovery service 602A may discover nodes participating in firmware framework 307, at least in part, by polling devices with one or more discovery requests, or by receiving device information broadcast by such devices.

At 1005, a node may collect and/or provide a device manifest describing information of any child device coupled to it. Particularly, at 1006 the device may create such a device manifest and enumerate advertised capabilities. At 1007, the node may discover child devices coupled to it, at least in part, by polling those child devices with one or more discovery requests, or by receiving device information broadcast by such child devices. At 1008, if there are more child devices, control returns to 1007. Otherwise, at 1009, the node sends its device manifest to orchestrator(s) 302 (or a parent node).

At 1010, orchestrator(s) 302 adds the device manifest to the firmware platform manifest. At 1011, orchestrator(s) 302 determines if there are more child devices to be discovered. If so, control returns to 1005. Otherwise, at 1012, orchestrator(s) 302 sends the platform manifest to the discovered devices, and method 1000 ends at 1013.

In some embodiments, operations 1005-1009 may be performed, recursively, for all parent/child devices in a hierarchical architecture, such that, any time an orchestrator or parent node is discovered, that child device gathers its own child device manifest containing information related to other devices found downstream from it. Each child device then sends a child device manifest to its respective parent device, until the device manifest reaches orchestrator 302 and is added to the overall, firmware platform manifest.

As such, method 1000 provides a dynamic, scalable mechanism for dynamically discovering connected devices participating as nodes 303 in firmware framework 307, by orchestrator 302, and in the absence of custom connection patterns.

In some cases, an IHS's OEM may wish to control one or more of an IHS's devices or components based upon the IHS's Thermal, Power, Performance, or Acoustic (TPPA) information or state. For example, the OEM may wish to control the power consumed by host processor 101 depending upon whether IHS 100 is on a desk or on the user's lap (e.g., determined using a gyroscope as one of sensors 110) or any other contextual information or state described herein. In other cases, if IHS 100 has its lid closed and is put in a bag without entering a sleep state, thermal conditions may become actionable.

Accordingly, method 1000 may also collect TTPA information (e.g., device temperature, power state, power consumption information, battery data, performance metrics, sound pressure level or cooling fan speeds, etc.) from available orchestrators and nodes as part of the discovery process. The TTPA information may be used to detect conditions or anomalies, and to take corrective action (without involvement by any OS), following a TPPA policy stored in policies module 308.

Such TPPA policy may be enforced by orchestrator 302 as part of its normal operations. In some cases, the TPPA policy may prescribe the type of TPPA information to be queried or otherwise collected from a given device to build the platform framework manifest.

For example, in response to a discovery request by orchestrator 302, consider the discovery response example below provided by node agent 603 of a node implementing host processor 101, presented in a JSON format:

```
{
  "comments": "CPU Perf and Power Information",
  "auth_token": "rt12342d",
  "container_id": "abcd",
  "platform_id": "p5435",
  "specifications": [{
    "type": "Cores",
    "PerfCores": "8",
    "EfficientCores": "6",
    "HyperThreadingEnabled": "True",
    "PerfCoreMaxTurboFrequency": "5000",
    "EfficientCoreMaxTurboFrequency": "3700"
  }, {
    "type": "Power",
    "Devicetype": "CPU",
    "InterfaceType": "MMIO",
    "PowerReportingMetric": "Watts",
    "BasePower": "15",
    "MinimumAssuredPower": "12",
    "MaxTurboPower": "55"
  }]
}
```

In various embodiments, firmware framework 307 may provide for the discovery of capabilities of each device participating as orchestrators or nodes. These capabilities may represent one or more exposed node services 505, which may then be collected, advertised, distributed, or otherwise made available to other nodes as part of capabilities module 309 within firmware framework 307.

Consider a situation where a user's IHS 100 is managed by an enterprise (e.g., an ITDM, an IT administrator, etc.).

When the user moves IHS 100 between different workstations or workspaces, each workspace having different external and peripheral device available, at any given time an ITDM may wish to identify the user's entire workspace, including all node capabilities and interfaces.

In a conventional IHS, however, OS restrictions would prevent an ITDM from discovering every device or component in IHS 100. Moreover, even when a device or component is discovered, the ITDM would not have an interface available through which to access the device without going through the IHS's OS.

In contrast, using firmware framework 307, an ITDM may send an inventory or manifest retrieval command or request from a remote management console application executed by remote service(s) 306 directly to orchestrator 302 (e.g., EC 109/215) via an OOB communication channel. Orchestrator 302 may communicate with any downstream node and/or secondary orchestrator to fulfill the command or request without any interference by any OS.

When using the OS, however, along with firmware framework 307, an ITDM may send an inventory or manifest retrieval command or request from a remote management console application executed by remote service(s) 306 to orchestrator 302 (e.g., EC 109/215) via a host application 904 of the operating system 304, and the OS discovery/communication services 902N.

For example, rather than setting an alert (e.g., a thermal alert) at the OS level, an ITDM's command, request, or policy may set the alert for a selected sensor or device directly in firmware, using capabilities 309 advertised for firmware framework 307.

In some embodiments, orchestrator services 601 may include capability/interface service 602B. Within firmware framework 307, capability/interface service 602B may advertise capabilities 309 (e.g., exposed services 505 from all orchestrators and nodes), provide 'get' and 'set' interfaces or APIs (e.g., exposed interfaces 507 of all orchestrators and nodes), and advertise or otherwise distribute those capabilities/interfaces across orchestrators, nodes, and consumers. Capability/interface service 602B may be integrated into, or distinct from, the firmware framework's discovery services 602A.

Again, node agent 603 may be configured to respond to a discovery request with a response that lists the exposed capabilities and interfaces of a given node. In cases where the node is a parent node, the parent's node response may list every exposed capability and interface of its child nodes.

Meanwhile, capability/interface service 602B may be executed in firmware by orchestrator 302 (e.g., EC 109/215), as part of orchestration services 601, and it may be responsible for handling a node's discovered capabilities and their interfaces.

Node agent 603 may also be configured to fulfill requests and execute commands received via exposed interface 507 to reach in and out of exposed services 505. In some cases, each exposed service 505 of each device 500 implementing orchestrator 302 and/or node 303 may be surfaced as an individual capability of capability module 309. Similarly, each exposed interface 507 of each device 500 implementing orchestrator 302 and/or node 303 may be surfaced as an individual interface of capability module 309.

In operation, when IHS 100 is powered on, discovery service 602A polls (or receives broadcasts) directly from other orchestrators or nodes with discovery information, which may include a capabilities and interfaces list, without requiring the participation of any OS (e.g., OS 304). When capability/interface service 602B receives a node's responses through discovery service 602A, it caches a list of exposed capabilities and interfaces from that node, in capabilities module 309, and still without requiring the participation of any OS. Then, capability/interface service 602B distributes the list of available capabilities to other nodes, and each node which may invoke those capabilities using their respective interfaces, in some cases subject to access controls, again without requiring the participation of any OS. When using the OS, on the other hand, capability/interface service 602B can distribute the list of available capabilities to the host application 904 either itself or via the OS discovery/communication service 902N, and the host application may invoke those capabilities using their respective interfaces, in some cases subject to access controls.

In some cases, orchestration services 601 may implement access control mechanisms defined by policies module 308. In some embodiments, the policies of the policy module can be set by the operating system(s) 304 or host application 904. For example, in some cases, a policy may provide that certain types of capabilities may be accessible to some nodes (or types of nodes) and not others. Additionally, or alternatively, these mechanisms may require certain types of node access to be performed via a selected interface, and not another interface. If two nodes have redundant capabilities exposed, for example, orchestration services 601 may select a first node to provide its capabilities to a first set of nodes or consumers (or to the host application 904 or operating system 304), and a second node to provide its redundant capabilities to a second set of nodes or consumers (or to the host application 904 or operating system 304), based on context information or state(s).

When a node is added to firmware framework 302 (e.g., an external device is added to a USB port, or a device finishes a firmware update and reboots, etc.), discovery service 602A may collect the node's exposed capabilities and interfaces and add them to the firmware framework manifest. Then, capability/interface service 602B may advertise or distribute those capabilities and interfaces across firmware framework 302. Likewise, the OS discovery/communication service 902N may advertise or distribute those capabilities and interfaces to the operating system(s) 304 or the host application 904. When the node is removed from firmware framework 302 (e.g., an external device is unplugged, etc.), discovery service 602A may remove the node's exposed capabilities and interfaces from the firmware framework manifest, and capability/interface service 602B may stop advertising or distributing those capabilities and interfaces across firmware framework 302. Likewise, the OS discovery/communication service 902N may remove the node's exposed capabilities and interfaces from the firmware framework manifest, and OS discovery/communication service 902N may stop advertising or distributing those capabilities and interfaces to the operating system(s) 304 or the host application 904.

In some cases, with respect to capabilities exposed by a given node, policies module 308 may include access control rules based, at least in part, upon: last date of a firmware update or version of the node; a determination of whether the node is integrated into heterogeneous computing platform 200 or external to it, or whether a node is enclosed within IHS 100 or external to it; a determination of whether the node is part of a docking station, hub, or external display; the ownership of the node (e.g., user vs. enterprise); a physical or geographic location of the node; a performance configuration setting of IHS 100; a power state of IHS 100; a consumer or type of consumer (e.g., 304-306), or any contextual information or state described herein.

In some cases, access control mechanisms may also determine which entity with firmware framework 307 enforces or oversees such access control. For example, in some cases, orchestration services 601 of orchestrator 302 may enforce access control by selectively advertising certain capabilities/interfaces, by denying, timing out, or not forwarding commands or requests that run afoul of access control rules (e.g., because a requesting node or consumer is not authorized to make such a request), etc. In some cases, the determination of which orchestrator or node enforces a given access control mechanism may be based upon any of the contextual information or state discussed herein.

Additionally, or alternatively, however, access control mechanisms may operate based on AI/ML models that receive contextual information or state and determine, based upon training data, whether to provide or block certain capabilities and/or interfaces to/from specific orchestrators, nodes, and/or consumers.

If OS 304, the host application 904, (or other consumer 305 or 306) requests a node's capabilities details from firmware framework 307 via orchestrator 302, capability/interface service 602B or the OS discovery/communication service 902N, may share access to the capability with OS 304 (e.g., an OS agent/driver), or the host application 904, subject to one or more access control rules enforced by orchestration services 601 based on policy module 309. Additionally, capability/interface service 602B, or the OS discovery/communication service 902N, may communicate available interfaces to OS 304 for accessing the advertised or requested capabilities (e.g., APIs for "get" and "set" operations). The information communicated to the OS 304 or a host application 904 can include, but are not limited to: system manifest and capabilities list (for some or all nodes and capabilities), orchestrator node identification and distance, device enumeration for some or all nodes on the system (e.g., OS discoverable node), and advertisable functions to be configured by an OS agent.

In addition, OS 304 or the host application may send commands to nodes (e.g., orchestrator 302 or node 303). The node (e.g., orchestrator 302 or node 303) can receive commands from the OS 304 or the host application 904 via the OS discovery/communication services (902N, 903), verify the integrity of command, and translate commands to targeted nodes (if communicated externally). The OS discovery/communication services (902N, 903) can be responsible for executing and distributing commands.

For example, consider an example of a discovery/capabilities request issued by orchestrator 302 (e.g., EC 109/215) as part of the operation of capability/interface service 602B, to a temperature sensor (e.g., one of sensors 110), as presented below in JSON format:

```
{
  "auth_token": "2YotnFZFEjr1zCsicMWpAA",
  "container_id": "abcd",
  "platform_id": "p5435",
  {
    "auth_token": "your_api_key_here", //Replace with
      your actual authentication token
    "request_type": "capabilities_and_interfaces",
    "source_ic": "IC1",
    "destination_ic": "IC2",
    "timestamp": "2023-09-02T10:30:00Z"
  }
```

In this example, a discovery/capabilities response sent by node agent 603 running on the temperature sensor may include its available capabilities and interfaces, as follows:

```
{
"response_type": "capabilities_and_interfaces",
"source_ic": "IC2",
"destination_ic": "IC1",
"timestamp": "2023-09-02T10:35:00Z",
"capabilities": [
    {
        "name": "Temperature",
        "description": "Provides temperature readings in
            Celsius and Fahrenheit",
        "interfaces": [
            {
                "name": "GET",
                "description": "Retrieve temperature readings"
            }
        ]
    },
    {
        "name": "Thermal Limit",
        "description": "Allows setting a thermal limit for
            alerts",
        "interfaces": [
            {
                "name": "SET",
                "description": "Set the thermal limit"
            }
        ]
    }
}
}
```

As such, a capability/interface service 602B may be configured to handle all nodes' capabilities, and to distribute or advertise those capabilities across firmware framework orchestrators and nodes in a workspace.

Ordinarily, using conventional techniques, a BIOS engineer would have to create a specific device object for each node and expose it to the OS. In contrast, using firmware framework 307, capability/interface service 602B may make their exposed capabilities available to other devices, orchestrators, and/or consumers independently of the state of any host OS.

Moreover, these systems and methods provide the ability to insulate calling applications and node agents 303 from a node's underlying functionalities via common interface definitions agnostic of chipset, platform, line-of-business, or host OS. These systems and methods may be scalable across disparate protocols (e.g., I²C, USB, MIPI, etc.), payload types (e.g., stream/real-time, events, messages, etc.), node types (e.g., On-the-Box or "OTB" versus external devices), and/or node topology (e.g., daisy-chaining, star, mesh, etc.).

Telemetry

In some applications, an ITDM may wish to collect raw telemetry data from IHS 100. Conventionally, an ITDM would not be able to perform many such tasks with existing OS tools due to restrictions put in place by OS developers. Even if some telemetry data were available, there would be no scalable manner to collect, process and optimize the collection of telemetry data from IHS devices via direct connections and/or without an OS agent's assistance.

In contrast, orchestrator 302 within firmware framework 307 may be configured to instantiate telemetry service 602C as part of its orchestration services 601. Telemetry service 602C may be responsible for enumerating and advertising telemetry capabilities, and handling telemetry settings based on defined and optimized communication paths, protocols, and/or policies. Because telemetry service 602C operates in firmware, orchestrator 302 is capable of handling telemetry operations independently of OS 304 and/or its state.

Particularly, telemetry service 602C may be configured to collect all telemetry capabilities and interfaces of all orchestrators and nodes coupled to firmware framework 307 (e.g., part of exposed services and interfaces 505 and 507). Telemetry service 602C may also be responsible for distributing telemetry capabilities and interfaces to all orchestrators and nodes.

In operation, telemetry service 602C may independently prioritize and scale communications to/from each telemetry data point, including orchestrators and nodes, to propagate the data through each node, and to deliver payload requests to a final endpoint.

Meanwhile, node agent 603 may be configured to manage node 303's telemetry collection and respond to telemetry requests. Node agent 603 may collect all downstream telemetry data points advertised for child nodes with performance optimizations.

Node agent 603 may include a telemetry queue responsible for performing local orchestration operations for child nodes, as well as for configuring and/or requesting telemetry inputs from connected nodes (i.e., similarly as functions as telemetry service 602C, except telemetry service 602C is a system-wide collector/orchestrator whereas node agent 603 is a child node present as a subcomponent into telemetry service 602C's prioritization schema). Node agent 603 may also be configured to perform telemetry pass-through operations and communications with all of node 303's child nodes.

When the telemetry consumer is OS 304, secondary IHS 305, or remote service 306, those consumers may include a respective service configured to initiate in-band, sideband, or OOB collection routines and obtaining telemetry data from telemetry service 602C for processing and collection.

In some cases, once a telemetry collection request is received by telemetry service 602C, telemetry service 602C may orchestrate execution of the request by identifying relevant collector node(s) (i.e., a node in charge of collecting telemetry data), aggregator node(s) (i.e., a parent node in charge of aggregating telemetry data collected by two or more child nodes), or bypass node(s) (i.e., a node that merely forwards requests and responses to upstream or downstream nodes without otherwise processing the request or response) for fulfilling the request.

How telemetry service 602C classifies a node (e.g., collector, aggregator, or bypass) may depend upon the type of telemetry collection (e.g., sensor readings, processor utilization data, etc.), the amount or size of the data being/to be collected, the available paths and protocols between nodes the power state of IHS 100, the location of IHS 100, etc.

Telemetry service 602C may maintain a list of all telemetry capabilities accessible through available interfaces. As such, telemetry service 602C may route incoming telemetry requests to appropriate collector nodes, while setting one or more of the collector nodes' parent nodes as aggregators and/or bypass nodes and/or selecting communication paths or protocols depending upon a telemetry policy stored in module 308 of firmware framework 307. Conversely, telemetry service 602C may route outgoing telemetry responses to appropriate consumers 304-306 (or other orchestrators and nodes) following the telemetry policy.

In some cases, policy rules that govern telemetry collection, path and protocol selection, node classification and configuration (e.g., collector, aggregator, bypass, etc.), and other settings or options may be based upon any of the contextual information or state described herein (e.g., IHS location, IHS performance or power state, current node utilization, network connection bandwidth, etc.).

For example, a telemetry policy may include certain rules that apply in normal operating situations, and other rules that apply when IHS 100 is undergoing field debug operations (e.g., under control of OS 204, secondary IHS 305, or remote service 306).

Particularly, in some applications, an OEM and/or ITDM may wish to collect debug data when there is a problem with IHS 100 in the field, and the debug data may include telemetry data (e.g., a device or component's thermal, power, performance, and/or acoustic or "TPPA" data). Conventionally, when a technician arrives at a customer's location of IHS 100, the technician may often find restrictions on the type of telemetry data that can be retrieved from which devices or components, as well as which diagnostic tools can be executed by IHS 100, for example, due to the customer's security blocks. In those cases, the technician may have to take the IHS 100 from the user to test it at the factory or lab, which means additional costs.

To address these, and other concerns, firmware framework 307 may provide an OS and/or silicon agnostic mechanism to collect telemetry data from selected nodes, particularly TPPA data (e.g., temperature, battery charge level or rate, power state, performance state, operating frequency, cooling fan speed, sound pressure level, etc.), and to store it without interference from any OS. The TPPA data may also be accessed directly by consumers 304-306 for debug operations though orchestrator 302, still without interference from any OS. Moreover, TPPA data may be made persistent across boots, via data module 310, thus leading to more accurate and faster, firmware-based debug operations.

Telemetry service 602C may be configured to collect, organize, advertise, and distribute TPPA data from/to various nodes of firmware framework 307, including external nodes 303AA-AN, or nodes 403 and 404A-N. TPPA data may also be consumed by firmware or OS-level agents via any available interface allowed by policy. Conversely, node agent 603 may be configured to collect TTPA data from its underlying hardware device and to transmit telemetry service 602C.

The TPPA data collection by node agent 603 may be configured by policy module 308 and/or it may depend upon context information. For example, when IHS 100 is communication with an ITDM's IHS (e.g., 305) or a remote console (e.g., 306), telemetry agent 602C may in response increase a data collection rate of node agent 603, and/or it may prioritize its telemetry traffic within interconnect 203, in some cases through alternative buses and/or protocols. When IHS 100 is disconnected from the ITDM's IHS or remote console, telemetry agent 602C may reduce the collection rate and/or it may deprioritize telemetry traffic within interconnect 203 in response thereto.
Security In various embodiments, when orchestrator 302 communicates with nodes 303 and/or when nodes 303 communicate among themselves, the control and/or data messages exchanged may be secured within firmware framework 307, at least in part, through operation of security service 602D. For example, when a low-level protocol does not offer session authentication mechanisms at runtime or firmware image level integrity verification, security service 602D may add such mechanisms to firmware framework 307 in a scalable manner across different node types, protocols, and topologies.

Although in some implementations security service 602D may be provided entirely by orchestrator 302, in other implementations orchestrator 302 may use security device 212 to execute one or more security operations (e.g., create, distribute, refresh, and void session keys, etc.) to implement aspects of security service 602D.

In some cases, security service 602D may be configured to identify when an internal or external node has been removed and/or re-programmed (e.g., with malicious or untrusted firmware). For example, security service 602D may be configured to perform node firmware image verification and inter-node communications, among other security operations.

With respect to node image verification, whenever a new node is connected to firmware framework 307, security service 602D may query the node for its firmware image details (e.g., digital certificate, signature, hash, etc.). In some cases, the digital certificate may have been specifically issued for use in firmware framework 307. Security service 602D may then perform a local verification of an image hash and/or it may also verify certificate(s) and/or signature(s) details of the node's firmware image with a cloud service (e.g., remote service 306). Upon successful verification, security service 602D may enable the node's discovery and participation in firmware framework 307.

As to inter-node communications, consider a scenario where nodes 303B and 303C wish to communicate with each other, for example, to exchange control or data messages between them. In that case, node agents 603B and 603C may reach into orchestration services 601 with a connection request, and, in response to the request, orchestration services 601 may share a session key with node agents 603B and 603C, and it may distribute unique cryptographic key pairs to node 303B and node 303C.

In communications sent from node 303B to node 303C, messages may be encrypted using node 303B's private key, which node 303C decrypts using node 303B's public key. In the reverse direction, messages sent from node 303C to node 303B may be encrypted using node 303C's private key, which node 303B decrypts using node 303C's public key. After decryption, each node may verify each message for a valid session key.

In some cases, this security/encryption layer provided by security service 603C may be used in response to a determination, by discovery service 602A, that a bus/protocol used by a node to join firmware framework 307 does not have proper native security mechanisms. In other cases, when a node's bus/protocol coupled to orchestrator 302 includes its own security mechanisms (e.g., BT) orchestrator 302 may leverage that protocol's native security mechanisms to establish and maintain secure communication channels across firmware framework 307. In yet other cases, this security/encryption layer provided by security service 603C may be used in addition or as an alternative to a node's native security mechanisms.

Inter-node communications may also be secured by security service 603C in response to IHS 100 being coupled to an external device that can be added as an orchestrator (and/or node) in firmware framework 307. When the external device is coupled to IHS 100, the layer of security/encryption provided by security service 603C may be added to one or more ongoing inter-node communications. When the external device is no longer coupled to IHS 100, this security/encryption may be stopped and firmware framework 307 may rely only upon the native security mechanisms afforded by conventional buses/protocols.

If for any reason orchestration service 601 decides to pause or stop ongoing inter-node communications (e.g., based, at least in part, on any of the context information or states described herein, following contextual rule(s) prescribed by a policy), security service 602D may revoke or invalidate the previously shared session key. Also, as an additional security feature, security service 602D may periodically refresh the session-key and/or cryptographic keys of the individual nodes based, at least in part, upon any context information or state described herein, also following contextual rule(s) prescribed by a policy.

In some cases, the security posture (e.g., firmware verification status of the node, whether security service 602D is using an additional encryption layer or native bus/protocol encryption for that node, etc.) of a node participating in firmware framework 307 may be visually indicated in graphical representation 700 of orchestrator 302 and nodes 303A-D.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
one or more processors;
a memory coupled to the one or more processors, wherein the memory comprises program instructions stored thereon that, upon execution by the one or more processors, cause the one or more processors to instantiate an Operating System (OS);
a controller, wherein the controller comprises firmware that, upon execution by a processing core, causes the processing core to instantiate an orchestrator; and
a plurality of devices coupled to the controller, wherein each device comprises firmware that, upon execution by a corresponding processing core, causes the corresponding processing core to instantiate a node corresponding to the device,
wherein the nodes are configured to communicate with the orchestrator within a firmware framework without any involvement by the OS, and wherein the nodes and orchestrator are further configured to communicate with the OS, and wherein the orchestrator is configured to:

identify the plurality of nodes corresponding to the plurality of devices;

collect, independently of the OS, a node manifest from each of the identified nodes, wherein each node manifest describes capabilities of the corresponding device;

based on the collected node manifests, produce a firmware platform manifest; and provide information from the firmware platform manifest to a host application of the OS.

2. The IHS of claim 1, wherein the controller comprises an Embedded Controller (EC) or Baseband Management Controller (BMC).

3. The IHS of claim 1, wherein the plurality of devices comprises at least one of: a sensor, a sensor hub, a Central Processing Unit (CPU), a Graphical Processing Unit (GPU), an audio Digital Signal Processor (aDSP), a Neural Processing Unit (NPU), a Tensor Processing Unit (TSU), a Neural Network Processor (NNP), an Intelligence Processing Unit (IPU), an Image Signal Processor (ISP), or a Video Processing Unit (VPU), a camera controller, an audio controller, a memory, a Universal Serial Bus (USB) device, a Peripheral Component Interconnect express (PCIe) device, or a Trusted Platform Module (TPM).

4. The IHS of claim 1, wherein at least one of the plurality of devices is coupled to the controller via at least one of: a Systems-on-Chip (SoC) interconnect, a Peripheral Component Interconnect Express (PCIe) bus, or a Universal Serial Bus (USB) port.

5. The IHS of claim 4, wherein the SoC interconnect comprises at least one of: an Advanced Microcontroller Bus Architecture (AMBA) bus, a QuickPath Interconnect (QPI) bus, or a HyperTransport (HT) bus.

6. The IHS of claim 1, wherein at least one of the plurality of devices or the controller is coupled to the one or more processors via at least one of: a Systems-on-Chip (SoC) interconnect, a Peripheral Component Interconnect Express (PCIe) bus, or a Universal Serial Bus (USB) port.

7. The IHS of claim 1, wherein the orchestrator or at least one of the plurality of nodes is configured to communicate with the OS via two or more distinct communication protocols.

8. The IHS of claim 1, wherein the orchestrator is configured to provide the information from the firmware platform manifest to the host application of the OS via one or more orchestration services selected from the group consisting of: an OS discovery service, and an OS communication service.

9. The IHS of claim 8, wherein the OS discovery service is configured at least in part by a policy to receive, from the orchestrator or the given node, an identification of at least one of: a given device corresponding to the given node, the controller corresponding to the orchestrator, a distance or latency of the given node from the orchestrator, a capability of the orchestrator or the given node, or a firmware version of the orchestrator or the given node.

10. The IHS of claim 8, wherein the OS discovery service is configured at least in part by a policy to receive, from the orchestrator or the given node, an identification of at least one of: (i) one or more capabilities of the orchestrator or the given node; and (ii) one or more interfaces usable to access the one or more capabilities.

11. The IHS of claim 8, wherein the OS discovery service is configured at least in part by a policy to:

ascertain a topology of the plurality of nodes, or of the orchestrator and the plurality of nodes; and communicate the topology to the OS.

12. The IHS of claim 11, wherein the topology comprises at least one parent node coupled to at least one child node.

13. The IHS of claim 8, wherein the OS communication service is configured at least in part by a policy to:

receive a command from the OS; and provide for the execution of the command from the OS.

14. The IHS of claim 13, wherein to provide for the execution of the command from the OS, the OS communication service is further configured to distribute the command to a different node.

15. A method, comprising:

producing, via a controller within an Information Handling System (IHS), an orchestrator of a firmware framework;

producing, via a plurality of devices coupled to the controller, a plurality of corresponding nodes, wherein each node is configured to communicate with the orchestrator;

enabling the orchestrator to:

identify the plurality of nodes corresponding to the plurality of devices;

collect, independently of an Operating System (OS) of the IHS, a node manifest from each of the identified nodes, wherein each node manifest describes capabilities of the corresponding device;

based on the collected node manifests, produce a firmware platform manifest; and provide information from the firmware platform manifest to a host application of the OS.

16. The method of claim 15, further comprising:

coupling a child device within the plurality of devices to a parent device within the plurality of devices;

in response to the coupling, producing, via the child device, a child node with respect to a parent node produced by the parent device in the firmware framework; and enabling, at least in part by the orchestrator, the OS to invoke a capability of the child node.

17. The method of claim 16, further comprising:

decoupling the child device from the parent device; and in response to the decoupling, removing the child node from the firmware framework.

18. A computer-readable storage device having instructions stored thereon that cause an Information Handling System (IHS), in response to execution of the instructions, to perform operations comprising:

producing, via a controller within the IHS, an orchestrator of a firmware framework;

producing, via a plurality of devices coupled to the controller, a plurality of corresponding nodes, wherein each node is configured to communicate with the orchestrator;

enabling the orchestrator to:

identify the plurality of nodes corresponding to the plurality of devices;

collect, independently of an Operating System (OS) of the IHS, a node manifest from each of the identified nodes, wherein each node manifest describes capabilities of the corresponding device;

based on the collected node manifests, produce a firmware platform manifest; and provide information from the firmware platform manifest to a host application of the OS.

19. The computer-readable storage device of claim 18, wherein the operations further comprise:

coupling a child device within the plurality of devices to a parent device within the plurality of devices;

in response to the coupling, producing, via the child device, a child node with respect to a parent node produced by the parent device in the firmware framework; and enabling, at least in part by the orchestrator, the OS to invoke a capability of the child node.

\* \* \* \* \*